US011799793B2

(12) United States Patent
Huang et al.

(10) Patent No.: US 11,799,793 B2
(45) Date of Patent: Oct. 24, 2023

(54) ADAPTIVE PRIVATE NETWORK WITH DYNAMIC CONDUIT PROCESS

(71) Applicant: Talari Networks Incorporated, Cupertino, CA (US)

(72) Inventors: Wei Huang, Cary, NC (US); Todd Martin, Campbell, CA (US); Justin Allen Patterson, Morrisville, NC (US); Robert W. Dickey, III, Raleigh, NC (US); Anthony Matteo Gallo, Apex, NC (US)

(73) Assignee: TALARI NETWORKS INCORPORATED, Cupertino, CA (US)

( * ) Notice: Subject to any disclaimer, the term of this patent is extended or adjusted under 35 U.S.C. 154(b) by 110 days.

(21) Appl. No.: 17/035,602

(22) Filed: Sep. 28, 2020

(65) Prior Publication Data

US 2021/0014170 A1    Jan. 14, 2021

Related U.S. Application Data

(62) Division of application No. 14/481,335, filed on Sep. 9, 2014, now Pat. No. 10,826,839.

(51) Int. Cl.
*G06F 15/16* (2006.01)
*H04M 15/00* (2006.01)
(Continued)

(52) U.S. Cl.
CPC ........ *H04L 47/365* (2013.01); *G06F 11/0709* (2013.01); *G06F 11/1464* (2013.01);
(Continued)

(58) Field of Classification Search
None
See application file for complete search history.

(56) References Cited

U.S. PATENT DOCUMENTS 6,535,482 B1 *   3/2003   Hadi Salim ........... H04L 47/263
                                                        370/236
6,721,290 B1     4/2004   Kondylis et al.
(Continued)

FOREIGN PATENT DOCUMENTS

JP     2022-550356 A    12/2022
WO   WO/2021/061581    4/2021

OTHER PUBLICATIONS

Notice of Allowance and Fee(s) Due for U.S. Appl. No. 16/916,053 (dated Apr. 30, 2021).
(Continued)

*Primary Examiner* — Nicholas R Taylor
*Assistant Examiner* — Ho T Shiu
(74) *Attorney, Agent, or Firm* — Jenkins, Taylor & Hunt, P.A.

(57) ABSTRACT

Systems and techniques, including special messages and state machines, are described that configures an intermediate site to dynamically trigger creation of and removal of a dynamic conduit between two sites based on usage that is tracked at the sites. The intermediate site providing WAN-to-WAN forwarding between the two sites, monitors throughput statistics on each local WAN link (LWL) associated with the two sites. If traffic between the two sites passes a configured first threshold or if LWL usage passes a configured second threshold, the intermediate site sends a message to the two sites to set up a dynamic conduit directly coupling the two sites. Busy lists are used to keep track of eligible site pairs. Once a dynamic conduit is set up between two sites, a grow technique tests the dynamic conduit increasing communication flows between the two sites each configured sampling period before putting the conduit in normal use.

19 Claims, 19 Drawing Sheets

(51) Int. Cl.

| | | |
|---|---|---|
| H04L 47/36 | (2022.01) | |
| G06F 11/20 | (2006.01) | |
| G06F 11/14 | (2006.01) | |
| G06F 11/07 | (2006.01) | |
| H04L 41/0659 | (2022.01) | |
| H04L 41/12 | (2022.01) | |
| H04L 67/12 | (2022.01) | |
| H04L 45/02 | (2022.01) | |
| H04L 45/00 | (2022.01) | |
| H04L 43/10 | (2022.01) | |
| H04L 47/28 | (2022.01) | |
| H04L 47/34 | (2022.01) | |
| H04L 69/28 | (2022.01) | |
| H04L 43/0852 | (2022.01) | |
| H04W 84/12 | (2009.01) | |

(52) U.S. Cl.
CPC ...... *G06F 11/2002* (2013.01); *G06F 11/2005* (2013.01); *H04L 41/0659* (2013.01); *H04L 41/12* (2013.01); *H04L 43/10* (2013.01); *H04L 45/10* (2013.01); *H04L 45/26* (2013.01); *H04L 45/40* (2013.01); *H04L 47/28* (2013.01); *H04L 47/34* (2013.01); *H04L 67/12* (2013.01); *G06F 2201/86* (2013.01); *H04L 43/0858* (2013.01); *H04L 69/28* (2013.01); *H04W 84/12* (2013.01)

(56) References Cited

U.S. PATENT DOCUMENTS

| | | | |
|---|---|---|---|
| 7,139,268 | B1 | 11/2006 | Bhagwat et al. |
| 7,426,181 | B1 | 9/2008 | Feroz et al. |
| 7,433,943 | B1 | 10/2008 | Ford |
| 7,664,048 | B1 | 2/2010 | Yung et al. |
| 7,801,030 | B1* | 9/2010 | Aggarwal ............ H04L 45/124 |
| | | | 370/227 |
| 8,125,907 | B2 | 2/2012 | Averi et al. |
| 8,274,891 | B2 | 9/2012 | Averi et al. |
| 8,452,846 | B2 | 5/2013 | Fredette et al. |
| 8,644,164 | B2 | 2/2014 | Averi et al. |
| 8,775,547 | B2 | 7/2014 | Fredette et al. |
| 9,069,727 | B2 | 6/2015 | Martin et al. |
| 9,100,338 | B2 | 8/2015 | Averi et al. |
| 9,246,828 | B1* | 1/2016 | Tagore ................. H04L 43/024 |
| 9,356,857 | B1 | 5/2016 | Narayanan et al. |
| 9,392,061 | B2 | 7/2016 | Fredette et al. |
| 10,341,237 | B2 | 7/2019 | Averi et al. |
| 10,447,543 | B2 | 10/2019 | Rovner et al. |
| 10,785,117 | B2 | 9/2020 | Lui et al. |
| 10,826,839 | B2 | 11/2020 | Huang et al. |
| 10,924,380 | B2 | 2/2021 | Rovner et al. |
| 11,082,304 | B2 | 8/2021 | Parsons et al. |
| 11,108,677 | B2 | 8/2021 | Lui et al. |
| 11,575,605 | B2 | 2/2023 | Rovner et al. |
| 2002/0027885 | A1 | 3/2002 | Ben-Ami |
| 2004/0006615 | A1* | 1/2004 | Jackson ................ H04L 67/288 |
| | | | 709/223 |
| 2004/0044761 | A1 | 3/2004 | Phillipi et al. |
| 2004/0064469 | A1 | 4/2004 | Takahashi et al. |
| 2004/0136379 | A1 | 7/2004 | Liao et al. |
| 2004/0199659 | A1 | 10/2004 | Ishikawa et al. |
| 2005/0102390 | A1 | 5/2005 | Peterson et al. |
| 2006/0239271 | A1 | 10/2006 | Khasnabish et al. |
| 2007/0248077 | A1 | 10/2007 | Mahle, Jr. et al. |
| 2007/0286090 | A1 | 12/2007 | Rusmisel et al. |
| 2007/0297332 | A1 | 12/2007 | Broberg et al. |
| 2008/0069133 | A1 | 3/2008 | Yong et al. |
| 2009/0041015 | A1 | 2/2009 | Zhang |
| 2009/0147806 | A1 | 6/2009 | Brueckheimer |
| 2010/0220604 | A1* | 9/2010 | Skog .................... H04L 45/00 |
| | | | 370/252 |
| 2011/0002240 | A1 | 1/2011 | Harel et al. |
| 2011/0007631 | A1 | 1/2011 | Raina et al. |
| 2012/0269087 | A1* | 10/2012 | Guo ..................... H04L 45/02 |
| | | | 370/252 |
| 2012/0314578 | A1 | 12/2012 | Averi et al. |
| 2013/0077701 | A1 | 3/2013 | Tsien et al. |
| 2013/0322255 | A1* | 12/2013 | Dillon ................. H04L 12/2867 |
| | | | 370/236 |
| 2013/0339101 | A1 | 12/2013 | Riley et al. |
| 2014/0112187 | A1* | 4/2014 | Kang ................... H04L 43/024 |
| | | | 370/253 |
| 2014/0173331 | A1 | 6/2014 | Martin et al. |
| 2015/0071067 | A1 | 3/2015 | Martin et al. |
| 2015/0207751 | A1* | 7/2015 | Branson .................. H04L 43/08 |
| | | | 709/226 |
| 2016/0006658 | A1 | 1/2016 | Averi et al. |
| 2016/0072706 | A1 | 3/2016 | Huang et al. |
| 2016/0142290 | A1* | 5/2016 | Ren ....................... H04L 45/745 |
| | | | 370/392 |
| 2016/0179850 | A1 | 6/2016 | Martin et al. |
| 2016/0182305 | A1 | 6/2016 | Martin et al. |
| 2016/0182319 | A1 | 6/2016 | Martin et al. |
| 2016/0182327 | A1 | 6/2016 | Coleman, Jr. et al. |
| 2016/0182387 | A1* | 6/2016 | Briscoe ................. H04L 47/30 |
| | | | 370/235 |
| 2016/0197802 | A1 | 7/2016 | Schultz et al. |
| 2016/0345341 | A1 | 11/2016 | Oliver et al. |
| 2017/0026280 | A1 | 1/2017 | Yu et al. |
| 2017/0041240 | A1 | 2/2017 | Tanida et al. |
| 2017/0055133 | A1 | 2/2017 | Dieselberg et al. |
| 2017/0094298 | A1 | 3/2017 | Gu |
| 2017/0099229 | A1 | 4/2017 | Suga |
| 2017/0150401 | A1 | 5/2017 | Guo et al. |
| 2017/0207976 | A1 | 7/2017 | Rovner et al. |
| 2017/0207996 | A1 | 7/2017 | Lui et al. |
| 2019/0349259 | A1 | 11/2019 | Rovner et al. |
| 2020/0336383 | A1 | 10/2020 | Lui et al. |
| 2021/0099375 | A1 | 4/2021 | Rovner et al. |

OTHER PUBLICATIONS

Notification Concerning Availability of the Publication of the International Application for International Patent Application Serial No. PCT/US2020/051882 (dated Apr. 1, 2021).

Non-Final Office Action for U.S. Appl. No. 16/916,053 (dated Mar. 18, 2021).

Commonly-assigned, co-pending U.S. Appl. No. 17/100,385 for "Adaptive Private Network (APN) Bandwidth Enhancements," (Unpublished, filed Nov. 20, 2020).

Notice of Allowance and Fee(s) Due for U.S. Appl. No. 16/523,997 (dated Oct. 13, 2020).

Commonly-assigned, co-pending U.S. Appl. No. 16/586,300 for "Methods, Systems, and Computer Readable Media for Providing a Multi-Tenant Software-Defined Wide Area Network (SD-WAN) Node," (Unpublished, filed Sep. 27, 2019).

Notice of Allowance and Fee(s) Due for U.S. Appl. No. 15/523,997 (dated Oct. 13, 2020).

Restriction and/or Election Requirement for U.S. Appl. No. 15/409,019 (dated Aug. 30, 2018).

Notice of Allowance and Fee(s) Due for U.S. Appl. No. 14/481,335 (dated Aug. 5, 2020).

Commonly-assigned, co-pending U.S. Appl. No. 16/916,053 for "Methods and Apparatus for Configuring a Standby Wan Link in an Adaptive Private Network," (Unpublished, filed Jun. 29, 2020).

Non-Final Office Action for U.S. Appl. No. 16/523,997 (dated May 26, 2020).

Notice of Allowance and Fee(s) Due and Applicant-Initiated Interview Summary for U.S. Appl. No. 15/409,001 (dated May 15, 2020).

Applicant-Initiated Interview Summary for U.S. Appl. No. 14/481,335 (dated May 13, 2020).

Non-Final Office Action for U.S. Appl. No. 15/409,001 (dated Jan. 27, 2020).

Non-Final Office Action for U.S. Appl. No. 14/481,335 (dated Jan. 24, 2020).

(56) References Cited

OTHER PUBLICATIONS

Applicant-Initiated Interview Summary for U.S. Appl. No. 15/409,001 (dated Dec. 6, 2019).
Advisory Action for U.S. Appl. No. 15/409,001 (dated Dec. 6, 2019).
Advisory Action for U.S. Appl. No. 14/481,335 (dated Nov. 8, 2019).
Applicant-Initiated Interview Summary for U.S. Appl. No. 14/481,335 (dated Oct. 23, 2019).
Final Office Action and Examiner-Initiated Interview Summary for U.S. Appl. No. 15/409,001 (dated Sep. 10, 2019).
Applicant-Initiated Interview Summary for U.S. Appl. No. 15/409,001 (dated Aug. 14, 2019).
Final Office Action for U.S. Appl. No. 14/481,335 (dated Aug. 8, 2019).
Notice of Allowance and Fee(s) Due and Examiner-Initiated Interview Summary for U.S. Appl. No. 15/409,019 (dated Jun. 4, 2019).
Non-Final Office Action for U.S. Appl. No. 15/409,001 (dated Apr. 4, 2019).
Non-Final Office Action for U.S. Appl. No. 14/481,335 (dated Apr. 1, 2019).
Applicant-Initiated Interview Summary for U.S. Appl. No. 14/481,335 (dated Mar. 22, 2019).
Applicant-Initiated Interview Summary for U.S. Appl. No. 15/409,019 (dated Mar. 15, 2019).
Notice of Allowance and Fee(s) Due for U.S. Appl. No. 15/647,924 (dated Feb. 19, 2019).
Applicant Initiated Interview Summary for U.S. Appl. No. 15/409,001 (dated Feb. 11, 2019).
Advisory Action for U.S. Appl. No. 15/409,001 (dated Feb. 4, 2019).
Non-Final Office Action for U.S. Appl. No. 15/409,019 (dated Dec. 6, 2018).
Final Office Action for U.S. Appl. No. 15/409,001 (dated Sep. 24, 2018).
Non-Final Office Action for U.S. Appl. No. 15/409,001 (dated Apr. 19, 2018).
Notice of Allowance and Fee(s) Due for U.S. Appl. No. 13/592,460 (dated Oct. 2, 2013).
Non-Final Office Action for U.S. Appl. No. 13/592,460 (dated May 24, 2013).
Non-Final Ex Parte Quayle Action for U.S. Appl. No. 17/100,385 (Jul. 1, 2022).
Notice of Allowance and Fee(s) Due for U.S. Appl. No. 17/100,385 (dated Oct. 7, 2022).
Final Office Action for U.S. Appl. No. 17/193,350 (dated Oct. 21, 2022).

\* cited by examiner

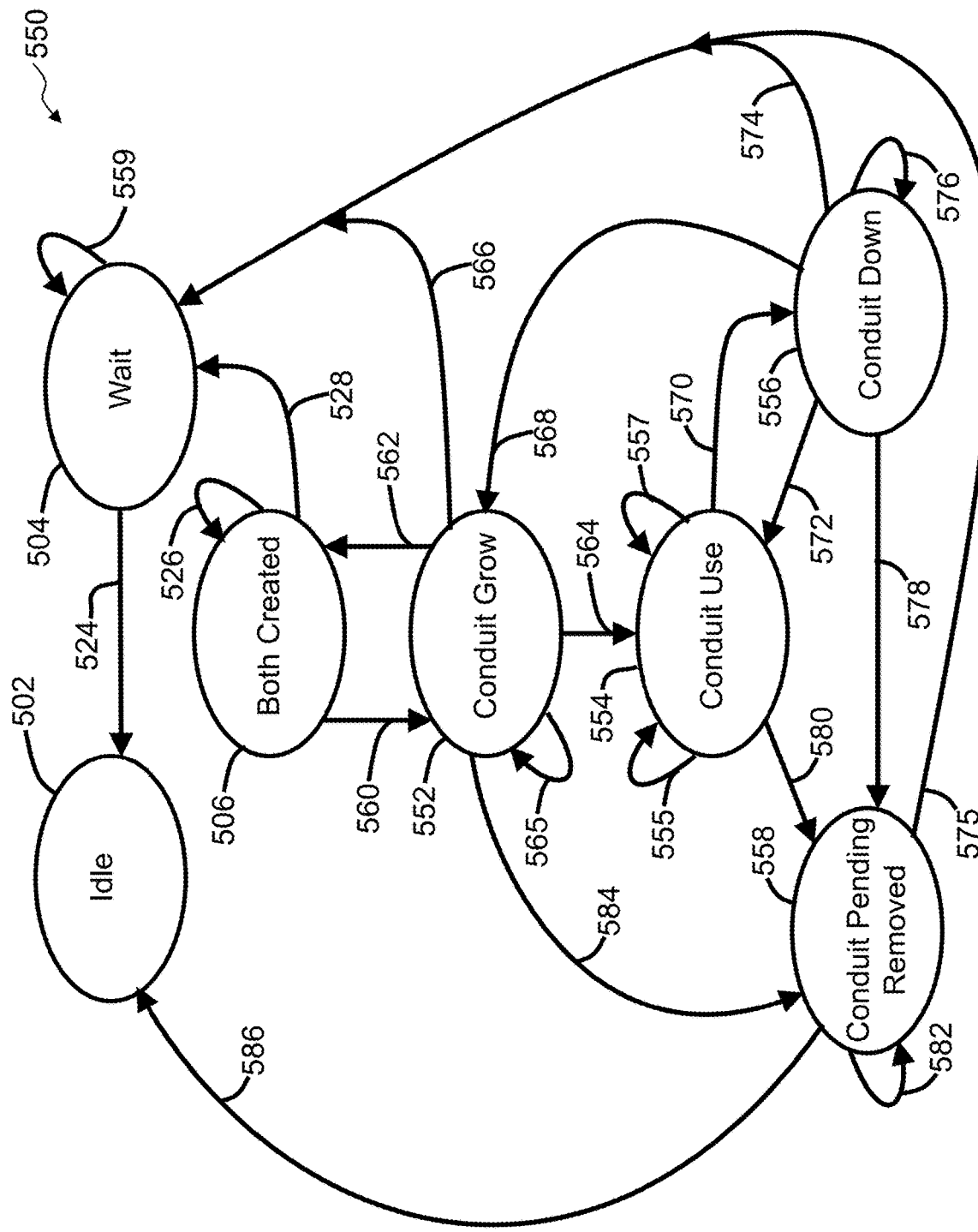

ADAPTIVE PRIVATE NETWORK WITH DYNAMIC CONDUIT PROCESS

This application is a divisional of U.S. patent application Ser. No. 14/481,335, filed on Sep. 9, 2014, the disclosure of which is incorporated herein by reference in its entirety.

CROSS REFERENCE TO RELATED APPLICATIONS

U.S. Pat. No. 8,125,907 filed on Jun. 11, 2009 entitled "Flow-Based Adaptive Private Network with Multiple WAN-Paths, U.S. patent application Ser. No. 13/208,825 filed on Aug. 12, 2011 entitled "Adaptive Private Network Asynchronous Distributed Shared Memory Services", and U.S. patent application Ser. No. 13/719,433 filed on Dec. 19, 2012 entitled "An Adaptive Private Network with Geographically Diverse Network Control Nodes" have the same assignee as the present application, are related applications, and are hereby incorporated by reference in their entirety.

FIELD OF THE INVENTION

The present invention relates generally to improved network communication. More specifically, the present invention relates to improved communication path bandwidth and reduction in communication path length through a dynamic conduit process.

BACKGROUND OF THE INVENTION

The introduction of frame relay in the early 1990's brought lower cost, higher bandwidth, improved reliability, and simpler management control to enterprise wide area networks (WANs) as compared to X.25 and point-to-point leased-line alternatives. Frame relay, together with single-source asynchronous transfer mode (ATM) and multiprotocol label switching (MPLS) services, still dominate the enterprise WAN market for corporate Internet traffic. A customer installs one of these networks and pays a single carrier a fee associated with the reliability and bandwidth the particular network provides. For example, a network may be advertised to provide "3 and ½ nines" (99.95%) or better reliability and have a fee based on this reliability and a cost per megabytes per second (Mbps). The present cost for such a network is almost as high as the fee paid back in 1998.

WAN standards include, for example, digital subscriber line (DSL), asymmetric digital subscriber line (ADSL), and multiprotocol label switching (MPLS), to mention a few. WANs are used to connect local area networks (LAN's) allowing devices in one location to communicate with devices and their users in other locations. In a WAN having a large number of remote sites, direct connections between the sites are many times statically configured. For example, site A is anticipated to have high bandwidth requirements for data transfer with site B and site C is anticipated to also have high bandwidth requirements for data transfer with site B. Since at the time the network is configured there may be little anticipated requirement for communication between site A and site C and since sites A and C can communicate to each other by going through site B, a communication path between sites A and C is not statically configured. With the network system operating over time, the original assumptions on communication paths will likely change and, for example, sites A and C may require much higher bandwidth at this later time than is easily achieved by communicating through the intermediate site B thereby causing congestion on the paths between sites A and B and between sites B and C. A reconfiguration of the network is not usually feasible due to configuration overhead and lost time in operating the network. Further, the dynamics of the network system may further change over time making repeated static configuration of the network inefficient and costly to implement. Further, static connections involve reservations of network resources. As data flow patterns change in the network, the reserved resources create non-optimal static connections which cause the network to reserve bandwidth that could be better used elsewhere in the network.

In addition to effects on bandwidth, there are also quality issues associated with statically configured networks. Traversing extra WAN hops can hurt quality of time sensitive applications like VOIP by adding latency and jitter. Also, data flow patterns within a network can change very often throughout the day. In a network with sites scattered across the world, some sites are starting a business day as others are ending and this changes where optimal direct connections should be located.

SUMMARY OF THE INVENTION

Among its several aspects, the present invention recognizes the current method has a number of problems as described above and provides approaches for addressing such problems. Among its several aspects, the present invention addresses systems and techniques which improve performance, reliability, and predictability of networks without requiring costly hardware upgrades or replacement of existing network equipment. To such ends, an embodiment of the invention addresses a method to trigger dynamic conduit creation. Data traffic is communicated between sites A and B indirectly through an intermediate site. In a first sampling cycle, a determination is made at the intermediate site that traffic between the site A and the site B is greater than a first threshold. In the first sampling cycle, a determination is made at the intermediate site that a local wide area network (WAN) link (LWL) usage is greater than a second threshold and site pair A-B is a member of a group of site pairs having high usage. A create conduit request message is sent from the intermediate site to the site A and to the site B to create a dynamic conduit directly between the site A and the site B, wherein data traffic is passed across the dynamic conduit between the site A and the site B without use of the intermediate site.

Another embodiment addresses a method for growing communication capacity in a dynamically created conduit between two sites. A two hop communication pattern between site A, an intermediate site, and site B is changed to a dynamic conduit with a one hop communication pattern between site A and site B without use of the intermediate site. A grow state is initiated on the dynamic conduit by setting an initial flow limit and transferring bulk data flows, originally communicated through the intermediate site, directly across the dynamic conduit between site A and site B. The flow limit is increased by a pre-specified amount each sampling cycle upon a determination that the bulk data flows transferred with minimum errors during each sampling cycle. The grow state is changed to a client use state after a flow upper limit has been reached.

Another embodiment addresses a computer readable non-transitory medium storing a computer program which causes a computer system to perform a method to trigger dynamic conduit creation. Data traffic is communicated between sites A and B indirectly through an intermediate site. In a first sampling cycle, a determination is made at the intermediate site that traffic between the site A and the site B is greater than a first threshold. In the first sampling cycle, a determination is made at the intermediate site that a local wide area network (WAN) link (LWL) usage is greater than a second threshold and site pair A-B is a member of a group of site pairs having high usage. A create conduit request message is sent from the intermediate site to the site A and to the site B to create a dynamic conduit directly between the site A and the site B, wherein data traffic is passed across the dynamic conduit between the site A and the site B without use of the intermediate site.

A further embodiment addresses a method for growing communication capacity in the presence of multiple site pairs contending for dynamic conduit resources. A determination is made to create a dynamic conduit between two sites by a site that is intermediate between the two sites, wherein the intermediate site tracks local WAN link (LWL) usages associated with multiple site pairs including the two sites. The intermediate site transfers those LWLs associated with the two sites that are most congested among the multiple site pairs to a dynamic conduit between the two sites to enable the site pairs to communicate directly over the dynamic conduit.

A more complete understanding of the present invention, as well as other features and advantages of the invention, will be apparent from the following detailed description, the accompanying drawings, and the claims.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

FIG. 5B illustrates an exemplary second state machine at the client site in accordance with the present invention;

DETAILED DESCRIPTION

Figure 1A:
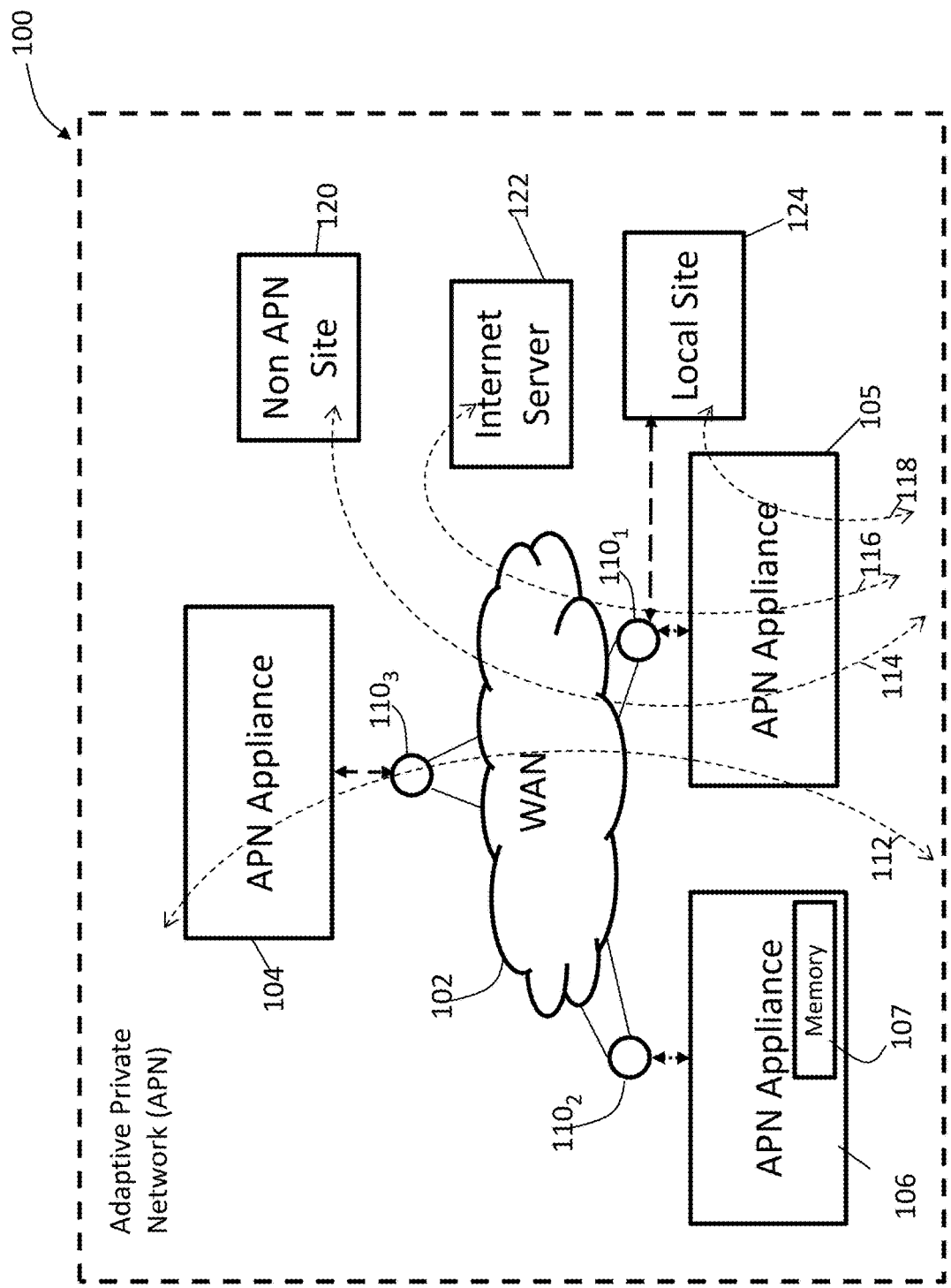
FIG. 1A illustrates an adaptive private network (APN) with APN network service paths in accordance with the present invention.

FIG. 1A shows an example of an adaptive private network (APN) 100 in which the present invention may be suitably employed as described in further detail below, including the network components, flows, paths, and services. The APN 100 includes one or more wide area networks (WANs), such as WAN 102, APN appliances 104-106, WAN routers 1101-1103, and network application services as well as APN conduits between APN appliances, as described in more detail below.

An APN path is a logical connection established between two WAN links located at different geographic sites across a WAN.

An APN conduit is a virtual connection between two APN nodes, also referred to as client sites, and formed by aggregating one or more APN paths and their allocated WAN link resources.

A conduit MTU is a minimum link MTU of the one or more APN paths between a source site and a destination site.

An APN appliance (APNA) is a device that contains APN client site functionality including all software modules within.

A WAN link represents a physical access point to the wide area network (WAN), such as a digital subscriber line (DSL) connection or a cable modem. The distinctive characteristic of a WAN link is the bandwidth, or in other words, the amount of data capacity available for transmission and reception. WAN links can be shared among APN conduits, and intranet and Internet network services. In the present embodiments, the APN appliances do not directly attach to WAN links. APN appliances communicate with WAN links through logical connections, such as the WAN routers 1101-1103 of FIG. 1A.

A private WAN link provides a physical access point to non-public WAN destinations. Examples of such private WAN links include an asynchronous transfer mode (ATM)

link with an ATM virtual circuit, a frame relay link with a frame relay circuit, a multiprotocol label switching (MPLS) tunnel, a virtual private network (VPN) tunnel, or a leased point-to-point line. Connectivity on a network having a private WAN link is made to a private list of destinations on the other end of the network. A public WAN link represents a physical access point to the Internet. It can be assumed that any public WAN link can establish a connection to any other public WAN link.

A local WAN link (LWL) is an APN client site's access point to a WAN. A site A's LWL is coupled to a corresponding remote WAN link for a site B. For a conduit between a site A and a site B, site A's local WAN links are site B's remote WAN links.

A routing domain represents a group of sites that can reach each other via an intermediate site that has WAN-TO-WAN forwarding enabled. All local routes of each site in the routing domain are added to all other sites in the routing domain.

A static conduit is a conduit configured in a configuration file and created at APNA startup time. A static conduit is not removed without changing the configuration file.

A dynamic conduit is a conduit created between APN clients when needed and can be removed when no longer needed.

An APN service is a set of processing steps performed on packets that are transmitted through the APN. As illustrated in FIG. 1A, data traffic that moves through APN 100 and APN appliance 106 may require different types of services depending on where the sending and receiving stations are located. An APN service instance is a particular configured contextual instance of an APN service held in an APN appliance memory 107 internal to the APN appliance 106, for example. An APN service instance's memory contains, but is not limited to, context specific configuration data, statistical data, and tracking states data. For example, an APN client site may have multiple APN conduits that connect to remote APN client sites. For each APN conduit there exists a separate APN service instance for the APN conduit service type.

An APN conduit service associated with path 112 manages network traffic packets that are transmitted through the APN 100 from the APN appliance 105 through router 1101, through the WAN 102, through another router 1103 to APN appliance 104. The APN conduit service for path 112 operates on both APN appliances 104 and 105. The APN conduit service sends and receives data between a first geographic location that has an APN appliance 105 and a different geographic location that has an APN appliance 104 utilizing the full benefits provided by the APN conduit service for WAN resource allocation and network adaptation. An APN intranet service associated with path 114 is used to manage the sending and receiving of data between a first geographic location that has the APN appliance 105 and a different geographic location within an enterprise non-APN site 120 that does not have an APN appliance by way of a WAN link that is also utilized by other APN services.

In another embodiment, an APN intranet service, such as the one associated with path 112, may be used to send and receive data to and from a different geographic location that has an APN appliance, but an administrator selectively configures the APN not to use the APN conduit service 112 for a particular type or class of traffic. An APN Internet service associated with path 116 is used to send and receive data between a first geographic location that has the APN appliance 105 and a different geographic location that is external to an enterprise network by way of a WAN link that is also utilized by other APN services. For example, traffic using the APN Internet service may be associated with a network user accessing a public Internet web server 122. An APN pass through service 118 is used to send and receive data between a first geographic location that has an APN appliance 105 and a local site 124 within the same first geographic location. In another embodiment, an APN pass through service may be used to send and receive data between a first geographic location that has the APN appliance 105 and a different geographic location within an enterprise network that does not have an APN appliance and does not traverse the WAN using any WAN links associated with any other APN services.

Dynamic conduits address changes in statically configured networks that are not just slow, gradual changes in network usage, but are happening real time throughout a day across a global network. In real time dynamic conduits dynamically optimize network performance adapting to changing communication patterns between nodes in the network. Dynamic conduits can also be used to offload traffic from intermediate nodes that may be experiencing congestion.

Figure 1B:
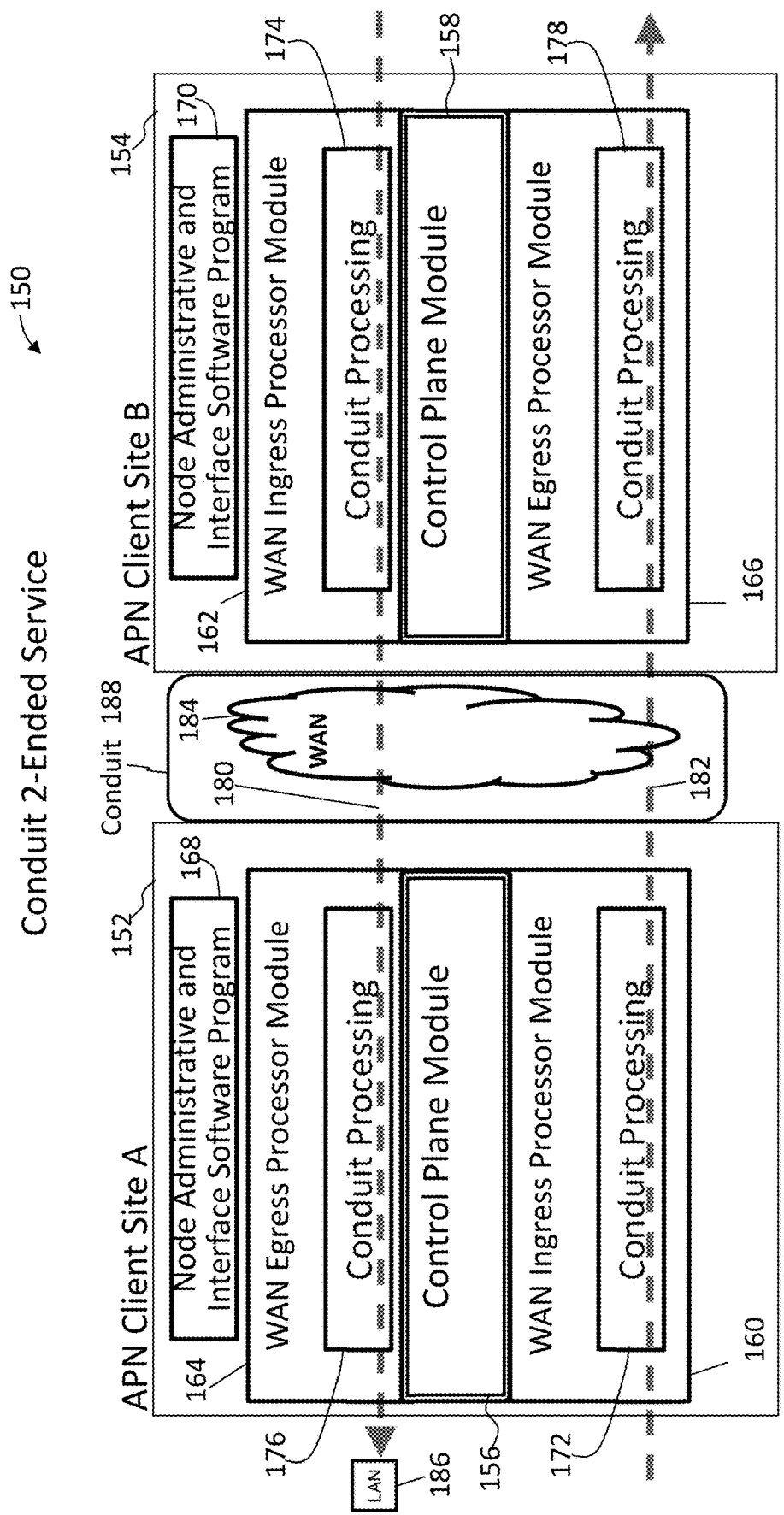
FIG. 1B illustrates an adaptive private network (APN) conduit 2-ended service between a client site A and a client site B according to the present invention.

FIG. 1B illustrates an adaptive private network (APN) conduit 2-ended service 150 between an APN client site A 152 and an APN client site B 154 according to the present invention. Each APN client site, also considered a node in the APN, contains a collection of software modules which govern its participation within the APN. The software modules for the APN client site A 152 and the APN client site B 154 include control plane modules 156 and 158, WAN ingress processor modules 160 and 162, WAN egress processor modules 164 and 166, and node administrative and interface software program modules 168 and 170, respectively. As illustrated in FIG. 1B, the WAN ingress processor modules 160 and 162 include conduit services 172 and 174, and WAN egress processor modules 164 and 166 include a duplicate conduit service 176 and 178. Intranet service, Internet service, and pass through service are also provided at each APN client site. Each APN service type, including conduit, intranet, Internet, and pass through service types, implements processes for each type of data traffic that is communicated to and from the WAN respectively.

As illustrated in FIG. 1B, APN conduit traffic, identified by bold dashed arrow paths 180 and 182, flows through the two APN client sites 152 and 154 as the traffic traverses the APN. WAN ingress processing module 162 of APN client site B 154 performs the WAN ingress conduit service processing 174 prior to transmitting the traffic 180 via the WAN 184 to the APN client site A 152. WAN egress processor module 164 of the APN client site A 152 performs the WAN egress conduit service processing 176 prior to transmitting the traffic 180 to the node or nodes located on LAN 186. The binding of the one APN client site's WAN ingress conduit processing 174 to the peer APN client site's WAN egress conduit service processing 176 constitutes an APN conduit 188 in which traffic is actively monitored and managed across multiple WAN resources.

The APN is capable of using disparate asymmetric WAN links which frequently vary in behavior of bandwidth, latency, jitter, packet loss and congestion over time. For example, the APN can use an asymmetric DSL WAN link that transmits data at 512 kbps upstream to the WAN and 6 Mbps from the WAN through the public network combined with a private symmetric leased circuit Ti WAN link that transmits data at 1544 kbps upstream and downstream and a cable broadband connection that transmits data at 312 kbps upstream to the WAN and 3 Mbps from the WAN to a peer having adequate aggregation bandwidth of these rates for a single transmission control protocol (TCP) file transfer session at a theoretical transmit rate of 2368 kbps and receive at 10544 kbps. Practically, under good network behavior, the actual rate would approach 90% of these rates. If the behavior of the connection was to change, for example the paths to the DSL link were to have dramatic levels of loss, the APN would, using its high frequency performance feedback mechanism, adapt the network to avoid or mitigate the issues by using alternative resources or attempting to recover from the loss.

In all path selections, conduit paths are evaluated and the best available path is selected. Any paths currently in a path quality good state are eligible to be chosen first. If multiple paths are in a path quality good state, then an estimated end to end time is evaluated and compared for each path, and the path with the lowest end to end time is chosen. If no path is in path quality good state, then a path with the highest bandwidth path quality bad state is chosen. A "one way time" (OWT) refers to the amount of time it takes for a packet to traverse a network from source to receiver. In the context of this invention, the one way time is measured by subtracting a receive time stamp from a WAN Egress Module 166 from the send time stamp from a WAN Ingress Module 160, FIG. 1B.

Figure 1C:
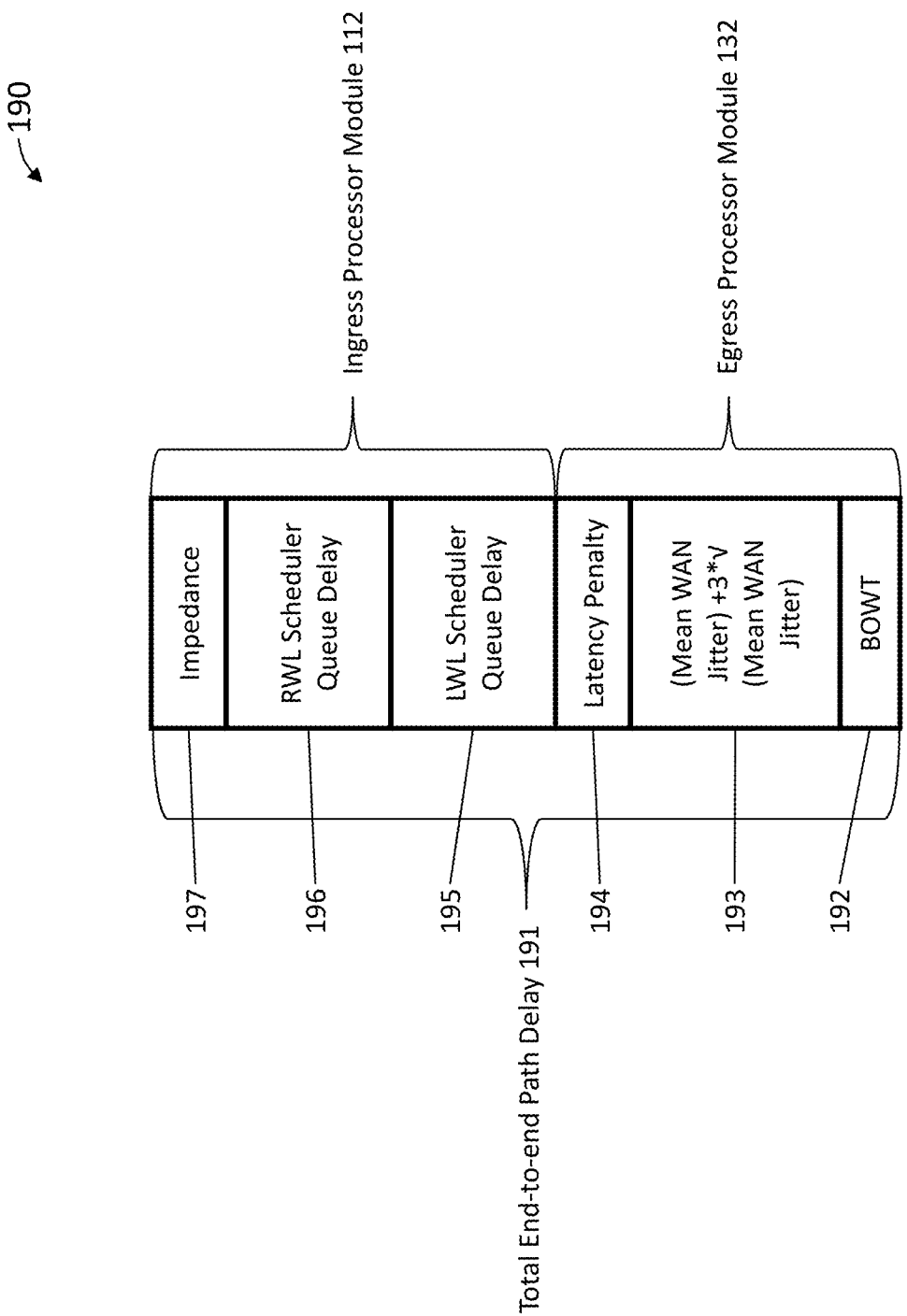
FIG. 1C illustrates a representation of factors used to determine the total end-to-end path delay according to the present invention.

FIG. 1C illustrates a representation of factors 190 used to determine the total end-to-end path delay 191 according to the present invention. The term "best one way time" (BOWT) refers to the lowest measured OWT for a particular packet on a particular path over a period of time. Initially, the evaluation process chooses one best path based on path latency which is calculated using a best one way time (BOWT) 192, mean WAN jitter 193, latency penalty for short term instability 194 and WAN link scheduler's queue delay times 195 and 196, with additional preferential treatment referred to as impedance 197 applied to any prior primary path for the APN traffic flow, if a primary path exists. Thus, an exemplary formula for estimating total end-to-end path delay is the BOWT 192+=(mean WAN jitter 193)+3*($\sqrt{}$(mean WAN jitter 193))+latency penalty 194+ local WAN link (LWL) scheduler queue delay 195+remote WAN link (RWL) scheduler queue delay 196+impedance 197. The BOWT 192, mean WAN jitter 193 and latency penalty 194 are provided by a remote APN conduit state resulting from control messaging from the egress processor module 166 of FIG. 1B, while the local WAN link scheduler queue delay 195, remote WAN link scheduler queue delay 196 and impedance 197 are provided by the WAN ingress processor module 160 of FIG. 1B. Refer to U.S. Pat. No. 8,125,907 filed on Jun. 11, 2009 entitled "Flow-Based Adaptive Private Network with Multiple WAN-Paths" for further details.

APN path processing services are responsible for providing a means of communicating user data and control information from one APN node to another APN node across the network. In particular, user data and control information may be transmitted from the WAN ingress processor module 160 of one APN node across the WAN and received at the WAN egress processor module 166, as shown for example in FIG. 1B. Exemplary APN path services which may be provided are listed below:

1.) Universal path tagging of all conduit traffic sent across the WAN with high resolution and highly synchronized APN time stamps to enable the highly predictive estimation of transmission latency and statistical variation of latency, subsequently in tandem a control plane modules' path state monitoring service is used to detect optimal paths for traffic to use across the APN.

2.) Use of the above optimal path identification to provide, in tandem with a WAN link accounting module, WAN bandwidth reallocation from low performing paths to higher performing paths.

3.) Universal path tagging, of all conduit traffic sent across the WAN APN path with path sequence numbers, enables sub second detection of packet loss enabling fast retransmission of user packets with little to no negative effect to the end users.

4.) Continual monitoring of and characterization of network behavior at times of lower utilization using heartbeats for fast reaction when network demand does arrive, such as provided by heartbeat generator.

5.) The ability to identify and proactively solicit retransmission when network traffic has been extraordinarily delayed or if the network has ceased to function using a Nag method, as provided by a Nag process, operating on the path state monitoring module.

6.) Universal path tagging of all conduit traffic with network utilization and non-utilization of WAN link resources enabling early detection and avoidance of network congestion prior to the packet loss that is typical of normal TCP like congestion methods.

7.) The ability to transmit time sensitive control messages without typical internal scheduling delays for software process staging to rate schedulers, while still maintaining proper long utilizations to the APN network to do retransmission of lost packets without the highly predictive estimation of transmission latency and statically variation of latency.

Using queuing theory, Poisson distribution assumptions, and a highly accurate APN wide APN clock sync that allows for accurate one way time measurement, a method is provided that is typically capable of estimating path latency and statistical jitter with an accuracy approaching ~99%. An equation which may be suitably used is best one way Time (BOWT)+(Mean WAN Jitter)+3*($\sqrt{}$(mean WAN jitter)). This equation provides a very accurate inference with just a few samples of traffic over a short period.

A path state represents the most current condition of the network path as determined by feedback received by the WAN egress APN node's path state monitoring process. As packets are received, the sequence numbers of the packets are tracked to see if any packets were lost in transit between the WAN ingress APN node and the WAN egress APN node. A method is used to trigger path state transitions that are biased toward more tolerance for loss in the short periods of packets received with substantially less tolerance of loss over longer periods. A unique aspect of this approach is the ability to track the path's packet loss thresholds over numerous durations simultaneously and continually while still maintaining low processor overhead. The result is an ability to detect a difference between occasional incidental short term network loss and long term persistent problems.

In a presently preferred embodiment, the APN node's software modules at a client site are stored and operate in the same physical APN appliance; however, the modules may also exist in separate physical APN appliances in alternative embodiments. The methods described in connection with the embodiments disclosed herein may be embodied directly in one or more software modules executed by a processor and memory complex such as a rack mounted processing device, a personal computer, a server, or the like having one or more central processing unit devices. The processor and memory complex, for example, may be configured to execute instructions under control of a software module program stored on a computer readable non-transitory storage medium either directly associated locally with the processor and memory complex, such as may be available through an instruction cache, or accessible through an I/O device. A software module may reside in a computer readable non-transitory storage medium which may include random access memory (RAM), flash memory, dynamic random access memory (DRAM), synchronous dynamic random access memory (SDRAM), read only memory (ROM), programmable read only memory (PROM), erasable programmable read only memory (EPROM), electrically erasable programmable read only memory (EEPROM), hard disk, a removable disk, a CD-ROM, digital video disk (DVD), other types of removable disks, or any other suitable non-transitory storage medium. A non-transitory storage medium may also be coupled to the processor and memory complex such that the hardware processor can read information from, and write information to, the storage medium over an intranet or the Internet.

An adaptive private network node (APN client site) contains software modules required to participate in an adaptive private network. An APN node may exist in one or more APN appliances at a location. An APN node contains a collection of software modules which govern its participation within an APN such as control plane modules 156 and 158, WAN ingress processor modules 160 and 162, and WAN egress processor modules 164 and 166 in FIG. 1B. The control plane module is responsible for controlling and participating in the control of the APN node in tandem with other APN nodes in the network.

The WAN ingress processor module 160 may suitably be embodied as software and hardware components responsible for processing network traffic for transmission from a local area network (LAN) to a WAN. The WAN egress processor module 164 may suitably be embodied as software operating on hardware components, such as a processor and memory complex that is responsible for processing network traffic for transmission from a WAN to a LAN. WAN ingress and WAN egress processor modules are discussed in further detail below. The APN client site's control plane module 156 may suitably be embodied as software operating on hardware components, such as a processor and memory complex that utilizes the APN client site's WAN ingress processor module 160 and WAN egress processor module 164 as the means for transmitting and receiving APN node to APN node control data across the WAN.

Software packages for an APN are distributed through administrative interfaces, such as downloading software using interfaces 168 and 170 to the APN client sites. After a software update, the APN services on the APN client sites 152 and 154 are then restarted thus bringing the APN software node configuration into synchronization.

Figure 2A:
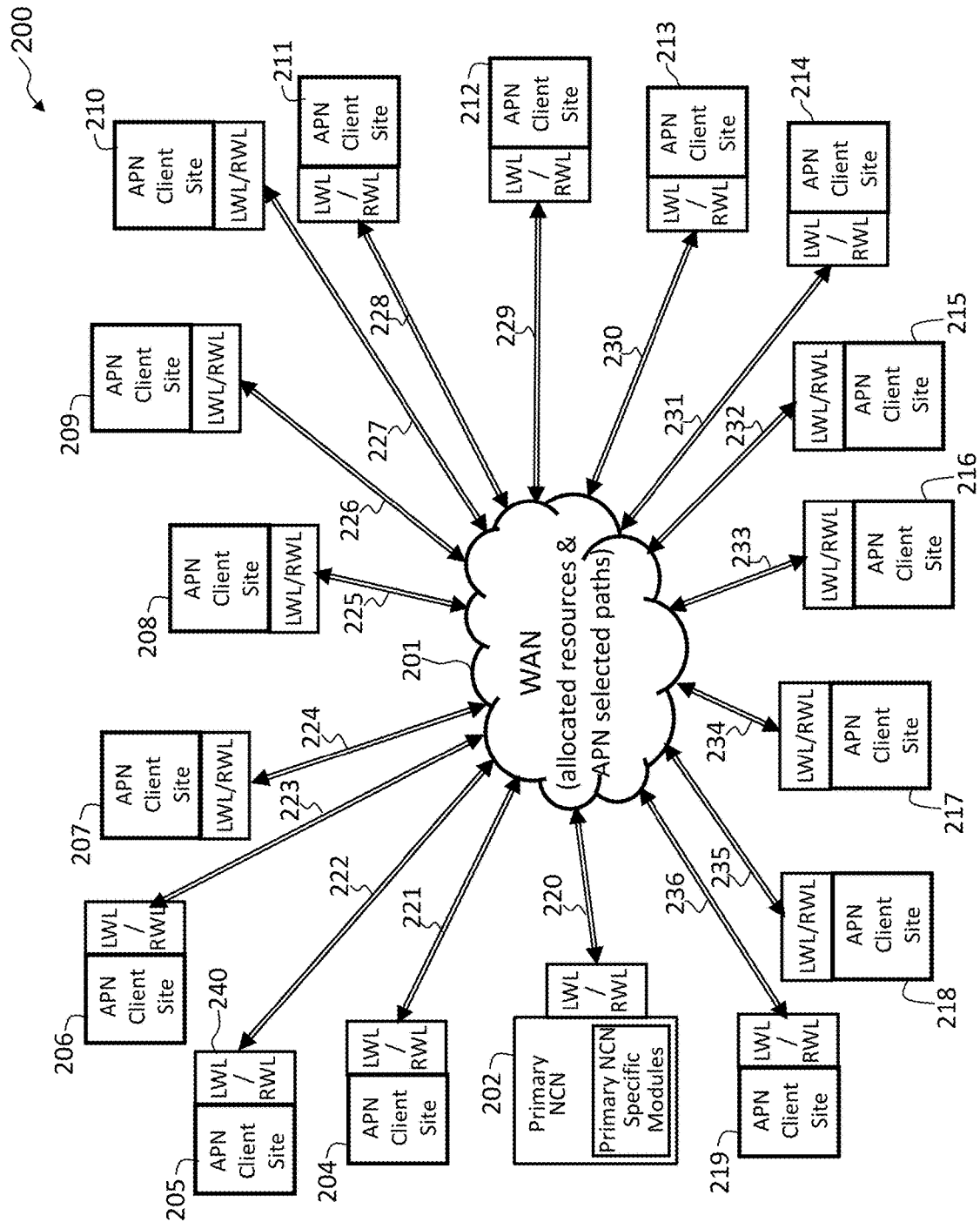
FIG. 2A illustrates an APN having an APN network control node (NCN) and sixteen APN conduits coupled to sixteen APN client sites according to the present invention.

FIG. 2A illustrates an APN 200 having an APN network control node (NCN) 202 coupled to conduit section 220 and sixteen APN conduit sections 221-236 coupled to sixteen APN client sites 204-219, respectively, according to the present invention. As illustrated in FIG. 2A, in a presently preferred embodiment, APN 200 is centrally configured. A network administrator configures the entire APN 200 through an APN configuration file that is processed by the NCN 202. The NCN 202 then distributes the configuration settings to all client sites in the APN 200. This method of configuring the APN 200 is intended to provide benefits to the administrator by providing a single point of configuration to the network. It also assures configuration consistency and compatibility for all APN client sites in the network simultaneously, with strict version checking. In a presently preferred embodiment, an intensive configuration audit and validation is done to the configuration prior to that configuration being applied to the network. This audit greatly decreases risks of invalid configurations being placed on the production network. The central configuration also provides for additional configuration bandwidth optimization for the network, by doing a holistic mapping of the APN resources and their initial allocations. Furthermore, the centralized configuration can provide information and warnings to the administrator as to the behavior of the configuration that may not be obvious or intended from the configuration, before loading the configuration onto a production network.

Each site 204-219 and primary NCN site 202 contains an APN appliance to provide APN functionality. The configuration of the APN 200, generally provides for connectivity between a site A, such as site 205, and for a site B, such as site 208, where the connectivity from the site A's perspective is site A→LWL→"WAN"→RWL→site B. The connectivity from the site B's perspective is site B→LWL→"WAN"→RWL→site A. The WAN 201 represents allocated WAN link resources and APN selected paths. In FIG. 2A, a conduit between a site A and a site B is formed by use of the conduit sections 221-236 and is a virtual connection between the corresponding site A and site B. The conduit includes a collection of paths and encompasses a path from a LWL at site A→"WAN"→RWL at site B.

In one presently preferred embodiment, APN conduits may exist between the NCN and for example sixteen APN client sites as shown in FIG. 2A, for example, although there is no systemic limit to the number of potential APN client sites. Each APN conduit may have the unique configuration parameters tailored by an administrator for the particular needs of each geographic location associated with a particular APN.

For a definition of APN path states, a description of path processing services is provided below. Any paths currently in a path quality good state are eligible to be chosen first. If multiple paths are in a path quality good state, then an estimated end to end time is evaluated and compared for each path, and the path with the lowest end to end time is chosen. If no path is in path quality good state, then a path with the highest bandwidth path quality bad state is chosen.

FIG. 2A is an exemplary APN 200 with geographically diverse client sites in accordance with the present invention. The exemplary APN 200 is configured with sixteen client sites 204-219, which are generally located remotely from each other. A site would be defined as remote if the devices are physically in different locations such as different buildings, cities, states, time zones or countries. For example, the primary NCN 202 may be located in a company's headquarters location in a first country with client sites 204-209 and client sites 217-219 also located in the first country. The other client sites 210-216 may be located in second country.

An APN appliance is a device that contains APN node functionality according to software modules, such as the control plane module 156 and 158, the WAN ingress processor module 160 and 162, and the WAN egress processor module 164 and 166, as described in more detail above with reference to FIG. 1B. The sixteen client sites 204-219 are coupled by conduit sections 221-236, respectively, and the conduit sections may be connected together to provide a configurable virtual connection between two connected APN appliances at the client sites. It is noted that while sixteen client sites 204-219 are illustrated, an APN may support as many client sites as are required for the APN.

A dynamic conduit is a conduit created between APN clients when needed and can be removed when no longer needed, based on a configured first threshold and a configured second threshold. For example, client site 205 can be configured with 2 local WAN links, one from a first network provider and one from a second network provider. Multiple conduits may be connected to site 205 which may be configured to use one or both of the local WAN links. In an exemplary scenario where all of the conduits that are connected to site 205 use both local WAN links, then when usage for either local WAN link passes a configured second threshold, creation of a dynamic conduit can be triggered as described in further detail below.

Figure 2B:
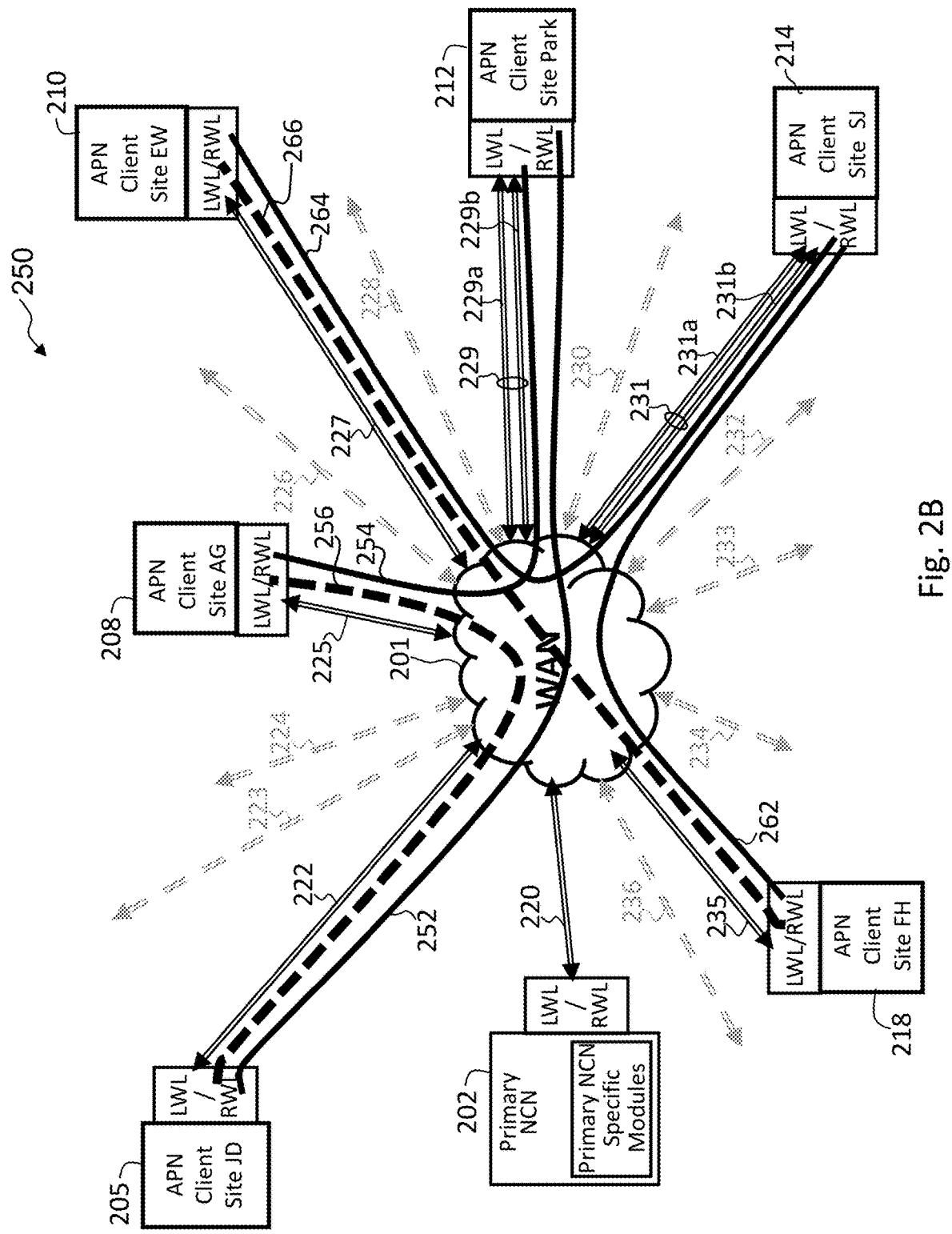
FIG. 2B illustrates an APN subset of the APN of FIG. 2A comprising a primary NCN site and a set of client sites in accordance with the present invention.

FIG. 2B illustrates an APN subset 250 of the APN 200 of FIG. 2A comprising a primary NCN site 202 and a set of client sites 205, 208, 210, 212, 214, and 218 in accordance with the present invention. Conduit section 229 of FIG. 2A is configured as a first conduit section 229a and a second conduit section 229b. Conduit section 231 of FIG. 2A is configured as a third conduit section 231a and a fourth conduit section 231b. At the APN startup, the APN network 200 is statically configured according to a configuration file having, for example, a conduit 252 connecting conduit sections 222 and 229b and a conduit 254 is configured by connecting conduit sections 225 and 229a. Also, a conduit 262 is configured by connecting conduit sections 235 and 231b and conduit 264 is configured by connecting conduit sections 227 and 231a. Since there is no conduit configured between client site 205 and client site 208 and no conduit configured between client site 210 and client site 218, WAN-to-WAN forwarding is used to communicate via intermediate client site 212 and intermediate client site 214, respectively. Thus, communication traffic between client sites 205 and 208 and between client sites 210 and 218 has to go through two hops to get to a destination site. Also, with client sites 205 and 208 located in the same geographic regions, such as a country in North America, and the intermediate client site 212 located in another geographic region, such as a country in Asia, a lot of unnecessary delay is caused for all traffic between the client sites 205 and 208.

Dynamic conduits address such a problem by creating conduits dynamically when they are needed and also removing them when they are no longer needed. For example, a dynamic conduit 256 may be created between client sites 205 and 208 and a dynamic conduit 266 may be created between client sites 210 and 218. The creation of a dynamic conduit is triggered at an intermediate client site when traffic throughput between two client sites passes a configured first threshold or usage on a local WAN link passes a configured second threshold. When usage on any site pairs does not exceed the configured first threshold, but there are so many site pairs that are trying to talk to each other, then an intermediate site's local WAN links may become really busy and exceed the configured second threshold on WAN link usage. One or more dynamic conduits are created as a result of exceeding either the configured first threshold or exceeding the configured second threshold. The created dynamic conduit carries traffic the same way as static conduits. Also, the created dynamic conduit supports rules and class properties that are specified for use by the dynamic conduits. While a particular APN may support the same classes and rules for all the dynamic conduits in that particular APN, a different APN may support different dynamic conduits that use different sets of rules and classes. A dynamic conduit is removed when the dynamic conduit is down for more than a configured time, such as 1 minute to 2 hours, no user data is transferred on the conduit for more than a configured time, such as 1 minute to 12 hours, or usage on the dynamic conduit is lower than a configured tear down threshold measured over a configured time, such as 1 minute to 12 hours, and the intermediate site approves the removal. The configured tear down threshold is used at client sites, such as a client site A and a client site B as shown in FIG. 4G. After a configured sampling, data traffic Timer (t5) has expired at client site A, for example, the client site A checks if its bits per second (bps) and or packets per second (pps) usage is lower than the configured tear down threshold. If the client site A's usage is lower than the configured tear down threshold, the client site A sends a message to the intermediate site that requests permission to remove an already set up dynamic conduit.

An intermediate site performing WAN-to-WAN forwarding between two other client sites in an APN network triggers dynamic conduit creation. The intermediate site, such as client site 212, keeps throughput statistics between the two other client sites on each local WAN link, such as on conduit 252 between client site 205 and client site 212 and on conduit 254 between client site 208 and client site 212. If one of the local WAN links is congested or traffic usage exceeds a configured second threshold, the intermediate site, client site 212, sends a message to the two other client sites, 205 and 208 to trigger them to create a dynamic conduit.

The decision to create a dynamic conduit can be decided by the intermediate site because it has better view of its local WAN link usages, and can use a dynamic conduit to offload those with the most congested local WAN links. The intermediate site selects the busiest site pairs to let them talk directly over a dynamic conduit. Every specified time period, such as 1 second to 5 minutes for example, an intermediate site evaluates each local WAN link usage and traffic between sites and sends a create dynamic conduit request to each site when usage conditions are met, such as passing a WAN link usage second threshold. Generally, the intermediate site does not keep a state representation of a dynamic conduit or conduits. The intermediate site does not track events at remote sites, such as what a remote site does with a conduit create request. When the intermediate site detects qualifying traffic levels, it sends a conduit create request at the next sampling interval.

The configuration settings that the NCN sends to each APNA as part of the centralized APN configuration contain all of the information necessary for the APNAs that may form a dynamic conduit to communicate to each other. This configuration information eliminates the need for an intermediate site to send this information in a create conduit request, keeping that message simple. This setting up of the configuration information also eliminates the need for sites forming a dynamic conduit to negotiate settings as part of the conduit creation process, which reduces the time needed for a dynamic conduit to form.

In an exemplary APN network having 128 client sites for example, there can be 8,128 client site pairs for each WAN link and with a maximum of 8 WAN links per client site, there can be 65,024 pairs of client sites. With addition of more client sites to that APN network, the number of pairs of client sites can increase dramatically. To address such complexity, two types of busy lists are kept at the intermediate site for pairs of client sites. A first type of busy list (the first busy list) corresponding to the configured first threshold is used for site pair throughput on "N" local WAN links, representing total traffic between the two sites. A second type of busy list (the second busy list) corresponding to the configured second threshold is used for site pair throughput on each local WAN link. After receiving a packet in the intermediate site, statistics for the site pair are updated and a check is made to determine if the site pair should be put on one or both of the busy lists, either by addition or by replacement of some other pair of client sites. For example, the throughput for a site pair is compared to the throughput of other site pairs on the second busy list. If the throughput is less than the last entry in the second busy list, then that site pair is not added to the second busy list. If the throughput is greater than the last entry in the second busy list, then the next entries in the second busy list are compared until a point in the list is found where the newly computed throughput is greater than a previous entry and less than a next entry where the site pair is added to the second busy list. To make room for this new entry, the last entry in the second busy list is removed. This method keeps the second busy list up-to-date with the busiest site pairs listed in order of throughput. A site pair A-B is added to the second busy list which lists site pair members of a group of site pairs having high usage. The second busy list having a preconfigured capacity of site pair members to keep track of the site pairs with the top usages in the system. Every sampling period or cycle, both busy lists are scanned and a create dynamic conduit request is sent to the related sites if the traffic between the sampling period exceeds the corresponding threshold. If the corresponding threshold is not exceeded, a site pair if presently on one of the busy lists is then removed from that busy list and a create dynamic conduit request is not sent. For site pairs on the second busy list, if the total WAN link usage exceeds the second threshold, then those site pairs on the second busy list will be sent a create dynamic conduit message. The system ensures that the create dynamic conduit message is sent only once each sample cycle to a site pair.

Figure 3A:
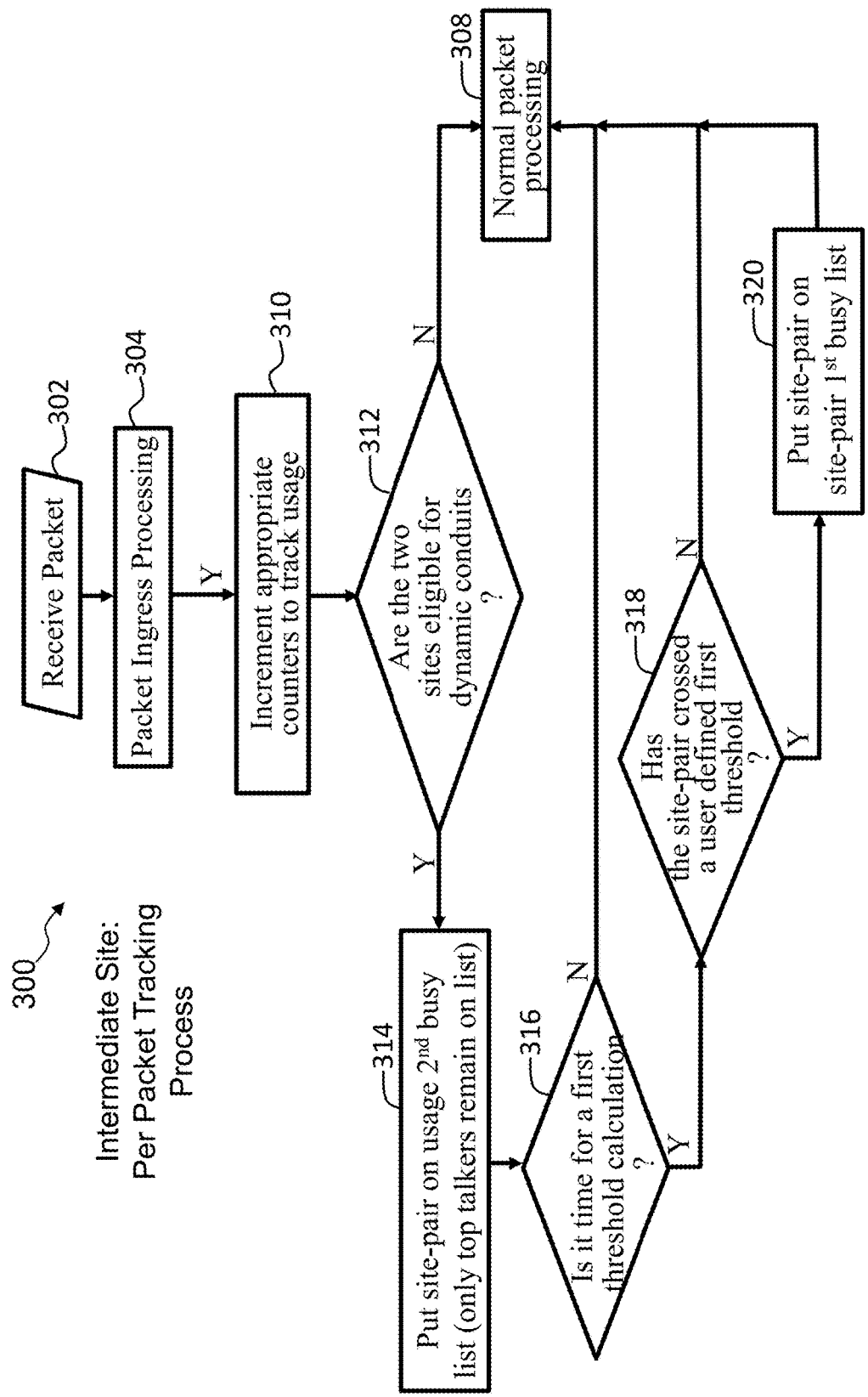
FIG. 3A illustrates an intermediate site per packet tracking process in accordance with the present invention.

FIG. 3A illustrates an intermediate site per packet tracking process 300 in accordance with the present invention. At block 302, a packet is received, such as from a LAN at the front end of WAN Ingress or from the WAN at the front end of WAN Egress. At block 304, the packet is processed in the WAN ingress processor module. At block 310, the appropriate counters are incremented to track usage. There are three types of counters used to track usage. A first counter tracks usage at each site pair and is associated with the first threshold as further described with regard to block 318 in FIG. 3A. A second counter tracks usage of each site pair on each local WAN link. The second counter value is used to determine whether the site pair should be put on the second busy list or be removed from the second busy list. A third counter tracks usage at each local WAN link's ingress and egress, providing a total for count values in each direction, such that there is an ingress counter associated with a WAN ingress threshold and a separate egress counter associated with a WAN egress threshold. The third counter content represents the LWL usage mentioned in block 354 and the counter mentioned in block 310 and is the total usage on a local WAN link. The third counter content includes conduit traffic and internet/intranet traffic usage on the WAN link and thus, shows how busy the local WAN link is. The third counter content is compared with the second threshold to determine whether creation of a dynamic conduit should be triggered. The third counter includes 2 set of counters, one set for ingress traffic and one set for egress traffic. In each set, there are two counters, one to count bps and one to count pps. The second counter is used to determine the top talkers, site pair with highest usage, on each local WAN link. Generally, the second counter content is not compared to the second threshold to trigger creation of a dynamic conduit.

At block 312, a determination is made whether the two sites are eligible for a dynamic conduit. If the two sites are not eligible for a dynamic conduit, the process 300 proceeds to normal packet processing block 308, where the packet is processed at a client site WAN ingress processor module according to WAN to WAN forwarding operations. If the two sites are eligible for a dynamic conduit, the process 300 proceeds to block 314. At block 314, the site pair is put on a usage second busy list. At block 316, a determination is made whether it is time for a first threshold calculation. If it is not time for a first threshold calculation, the process 300 proceeds to the normal packet processing block 308. At block 316, if it is time for a first threshold calculation, the process 300 proceeds to block 318. The system generally does not perform the calculations of block 318 and 320 for each packet received since this might take too much time and impact performance. Thus, after a time period, such as 100 milliseconds (ms), has elapsed the calculations of these blocks will be performed when the next packet is received. At block 318, a determination is made whether the site pair has crossed the user defined first threshold. If the site pair has not crossed the user defined first threshold, the process 300 proceeds to the normal packet processing block 308. If the site pair has crossed the user defined first threshold, the process 300 proceeds to block 320. At block 320, the site pair is put on a site pair first busy list. Each packet, such as packet 302, is processed in the same or a similar manner as illustrated in the process 300. When the calculations of blocks 318 and 320 are skipped, the system goes straight to the normal packet processing of block 308.

Figure 3B:
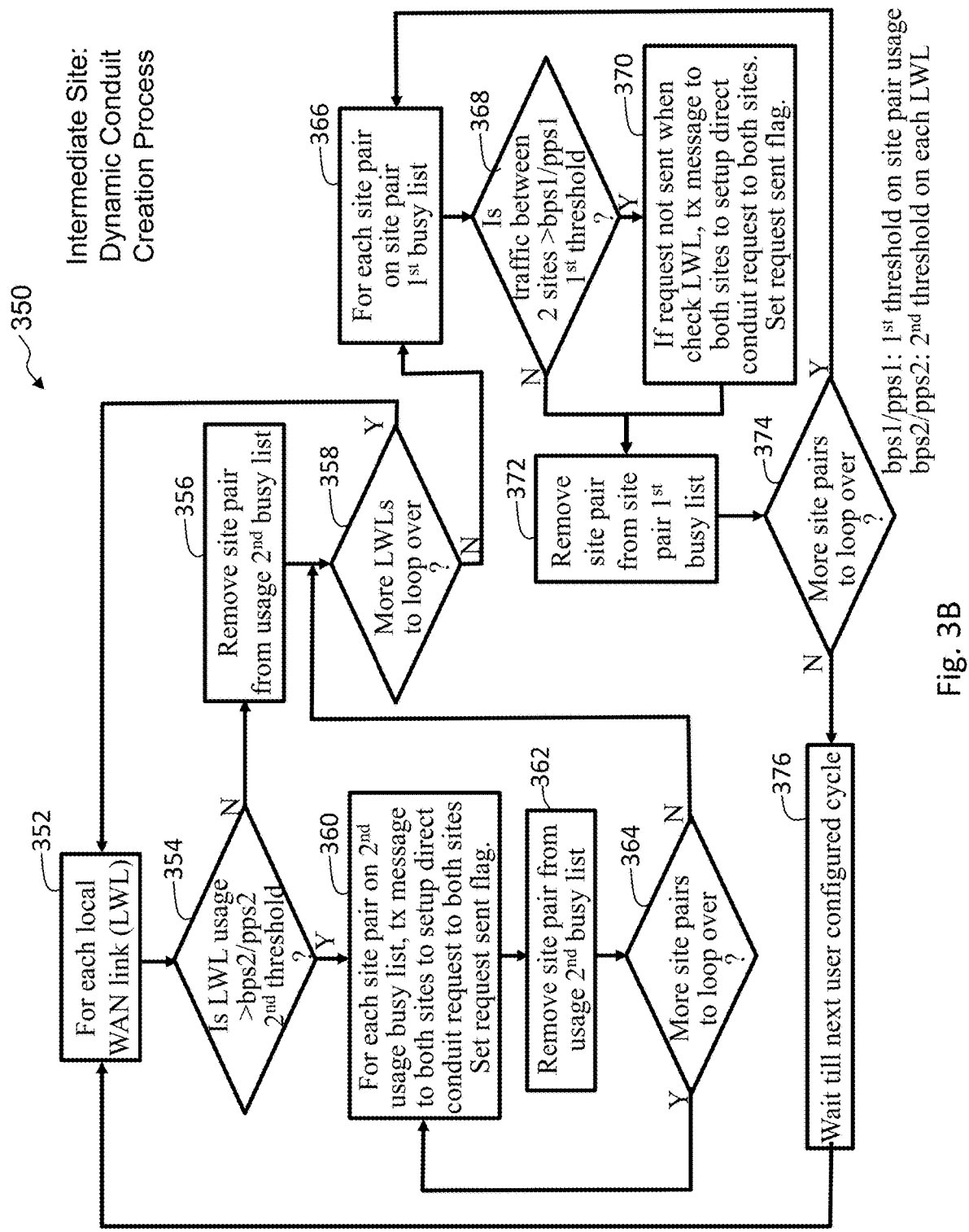
FIG. 3B illustrates an intermediate site dynamic conduit creation process in accordance with the present invention.

FIG. 3B illustrates an intermediate site dynamic conduit creation process 350 in accordance with the present invention. Process 350 is initiated at each sampling cycle. A sampling cycle may be configured by a user, for example to determine how fast dynamic conduits should be created. After the process 350 has concluded, both busy lists are cleared, in preparation for the next sampling cycle and the process 350 is re-initiated. Each sampling cycle starts with pre-specified values to allow decision processing to be based on throughput calculations determined during each sampling cycle. For example, the sampling cycle may be configured from 1 second to 300 seconds. In another example, if a user wants a dynamic conduit creation to be triggered at a first voice call, the user would generally set a sample cycle parameter to be one second and also set the first threshold at a really low value. If user wants the dynamic conduit creation to be triggered when there is substantial traffic between two sites, and for a certain amount of time, such as five minutes, then the user would set the sample time to five minutes.

For each packet received, the process 300 of FIG. 3A is run to update the two busy lists. When the sampling cycle time is ended, the process 350 of FIG. 3B is run to determine if a dynamic conduit should be created. At the end of the process 350, the three counters as described above, and the busy lists are re-initialized in preparation for the start of the next sampling cycle.

At block 352, the process 350 is started for each local WAN link (LWL) and proceeds to block 354. The first threshold bps1 rate or a pps1 rate on site pair usage and the second threshold bps2 rate or pps2 rate on each LWL are chosen by the network administrator for use in determining when to create and when to remove a dynamic conduit. The thresholds are set at the intermediate site. At block 354, a determination is made whether the local WAN link has a total usage, according to the third counter content as described above, that is greater than the second bits per second (bps2) rate or greater than the second packets per second (pps2) rate. If the LWL usage is not greater than the bps2 rate or the pps2 rate, the process 350 proceeds to block 356. At block 356, the site pair is removed from a usage second busy list, but will be added back depending on the tracking process 300 as described above. At block 358, a determination is made whether there are more local WAN links to be examined. If there are more LWLs to be examined, the process 350 returns to block 352 to examine a next LWL.

Returning to block 354, if the LWL usage is greater than the bps2 rate or the pps2 rate, the process 350 proceeds to block 360. At block 360, for the examined site pair on the usage second busy list, a message is transmitted (tx) to both sites to create a dynamic conduit, also referred to as a direct conduit. Also, at block 360, a request dynamic conduit message sent flag is set active. At block 362, the site pair just examined is removed from the usage second busy list but will be added back depending on the tracking process 300 as described above. The site pair will be added to the usage second busy list if the dynamic conduit fails to be created, such as may occur because of a network error or no resources at the site, and the dynamic conduit creation process is started again. However, if the dynamic conduit is created, then the traffic between the two sites does not flow through the intermediate site and thus, the intermediate site cannot track the traffic flow and cannot modify the busy lists for the site pair. At block 364, a determination is made whether there are more site pairs on the usage second busy list to process, in other words to loop over. If there are one or more site pairs to loop over, the process 350 returns to block 360 to set up the next dynamic conduit between another site pair of nodes. The decision at block 354 needs to check each local WAN link only once every sampling cycle. If the second threshold at block 354 is exceeded, then all site pairs on that LWL's second busy list are sent a create dynamic conduit message.

Returning to block 364, if there are not any further site pairs to be processed, the process 350 proceeds to block 358. At block 358, a determination is made whether there are more LWLs to loop over. If there are additional LWLs to loop over, the process 350 returns to block 352. If there are no further LWLs to loop over, the process 350 proceeds to block 366. At block 366, a sub-process is started for each site pair on a site pair first busy list and the process 350 proceeds to block 368. At block 368, a determination is made whether the traffic between a site pair on the site pair first busy list is greater than the first threshold, a bps1 rate or a pps1 rate. If the traffic between the two sites is not greater than the bps1 or pps1 first threshold, the process 350 proceeds to block 372. If the traffic between the two sites is greater than the bps1 or pps1 first threshold, the process 350 proceeds to block 370. At block 370, if the request to set up the dynamic conduit is not sent at block 360, since, for example, the usage test at block 354 indicated the LWL usages was not greater than the bps2 rate second threshold or greater than the pps2 rate second threshold, a message is sent to both sites to set up the dynamic conduit. For example, if there are two WAN links at site A, one operating at 3 Mbps and the other operating at 4 Mbps, bps2 for the first WAN link may be set to 2 MBPS and bps2 for the second WAN link may be set to 3 MBPS. The first threshold bps1 may be set to 1 Mbps. With this situation, if any site pair has 1 Mbps between them, a dynamic conduit is created.

In many systems, traffic between sites may comprise a large number of small packets and as a consequence may not meet the bps1 or bps2 thresholds though due to the large number of packets, a lot of stress is exerted on the intermediate site. In this case, it is better to create a dynamic conduit using the pps1 and pps2 threshold values. The determination that a request was not sent at block 360 may also be determined by examination of the request dynamic conduit message sent flag which if not set indicated no create message was transmitted to the two sites. At block 372, the site pair just examined is removed from the site pair first busy list but will be added back depending on the tracking process 300 as described above. The site pair is removed to allow the system to start a next sampling cycle with data at pre-specified values and with busy lists initialized. For example, all three counters described in the process 300 of FIG. 3A are set to zero and the two busy lists cleared. At block 374, a determination is made whether there are more site pairs to be examined, and thus looped over. If there are more site pairs to be looped over, the process 350 returns to block 366. If there are not any further site pairs to be looped over, the process 350 proceeds to block 376. At block 376, a wait period is started to wait till the next user configured cycle. A user configured cycle is based on the sample timing, such as every one to three hundred seconds the user configured cycle is run, as set in the intermediate site settings. After the wait of one to three hundred seconds is over and at the next user configured cycle, the process 350 returns to block 352.

Various timers are utilized in the dynamic conduit creation process since communication paths between client sites may be affected by various system events which may degrade a communication path or be more severe and shut down a communication path. For example, Timer(t0) is a connecting timer that is started after sending out a create conduit message to a peer client site. A configured timeout value is set up on the order of one second.

Timer(t1) is an ACK create retransmit timer that is started after sending out an ACK create message to a peer client site. A configured timeout value is set up on the order of one second.

Timer(t2) is a conduit down timer that is started when a conduit enters a down state. Messages received over a conduit causes the Timer(t2) to be restarted. When Timer(t2) expires the conduit is considered down and is removed. A user configured timeout value is set up on the order of one minute to 2 hours. The Timer(t2) allows the user site to remove the dynamic conduit early. If the dynamic conduit is up and running, a check is made when Timer(t5) expires and if the usage is lower than the configured tear down threshold, the dynamic conduit is removed. If the dynamic conduit is down, the user site may want to remove it early in order to free up resources for other dynamic conduits. The user site sets Timer(t2) to be less than Timer(t5).

Timer(t3) is a conduit grow timer that is started when a conduit comes up after creation. This timer controls a conduit's grow cycles. In one embodiment, there are a total of fifteen grow cycles specified, wherein each cycle is set at 200 ms except the first cycle which can be set to two seconds. The timing can be modified depending on a message round trip time between the end points of the dynamic conduit.

Timer(t4) is a conduit remove pending timer that is started after sending out a remove conduit request message to a peer client site. A configured timeout value is set up on the order of two seconds for the peer client to acknowledge (ACK) the remove conduit request message and an additional two or three seconds by restarting the Timer(t4) upon receiving acknowledgement of a remove conduit message to a peer client site, to let all packets for the conduit drain out before actually removing the conduit instance in the software and APN. The Timer(t4) is also started upon receiving a remove conduit request message from a peer. When the Timer (t4) expires, the dynamic conduit is removed.

Timer(t5) is a conduit usage sampling timer that is started after a conduit enters into a use state. A user configured timeout value is set up on the order of one minute to 12 hours.

Timer(t6) is a wait timer that is started when a dynamic conduit fails to be created or a dynamic conduit is removed because it is dead longer than a Timer(t2) delay period. This indicates there is something wrong in the network and instead of repeatedly creating and removing a dynamic conduit the Timer(t6) is started and after Timer(t6) expires the dynamic conduit is attempted to be restarted. A user configured timeout value is set up on the order of one minute to one hour which is indicative of a user configured dead time greater than t2.

Figure 4A:
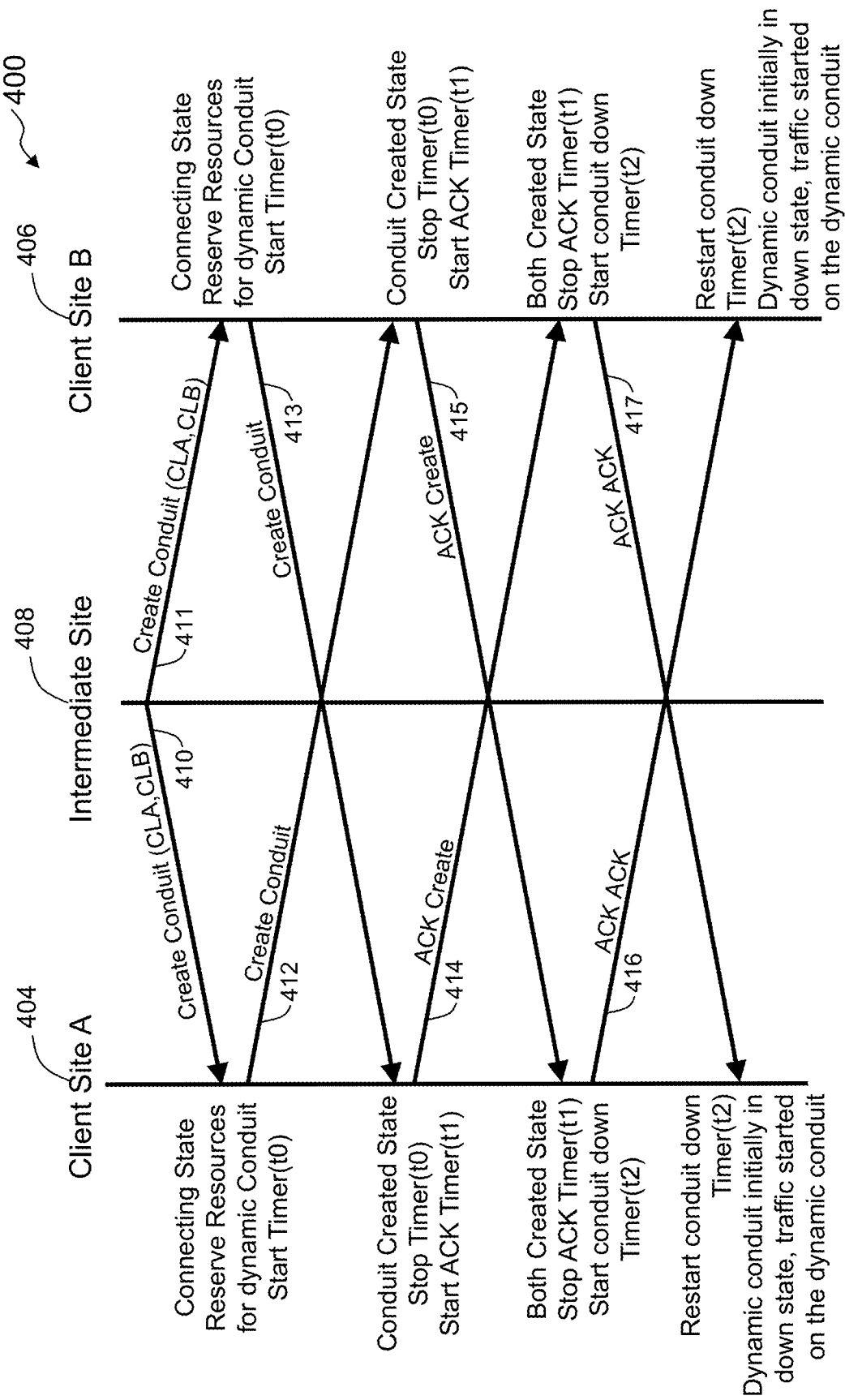
FIG. 4A illustrates a create dynamic conduit message sequence in accordance with the present invention.

FIG. 4A illustrates a create dynamic conduit message sequence 400 in accordance with the present invention. FIG. 4A illustrates a client site A 404, a client site B 406, and an intermediate site 408 connecting the two client sites. The client site A 404 has a WAN ingress processor, such as the WAN ingress processor module 160, and a WAN egress processor, such as the WAN egress processor module 164. The client site B 406 has a WAN ingress processor, such as the WAN ingress processor module 162, and a WAN egress processor, such as the WAN egress processor module 166. The processing of packets is accomplished within a control plane module, such as the control plane module 156. Paths are unidirectional so they have a sender, WAN ingress side, and a receiver, WAN egress side. The processing of the packets occurs in the control plane on the WAN ingress side of the path and the control plane on the WAN egress side of the path. This approach is advantageous because, the WAN ingress processor generally has no way to receive packets because it does not receive packets from the WAN.

FIG. 4A shows the create dynamic conduit message sequence 400 between a client site A 404 and intermediate site 408, between the intermediate site 408 and a client site B 406, and between client sites A 404 and B 406. In FIG. 4A, client site A 404 is communicating with client site B 406 indirectly through the intermediate site 408 using WAN-to-WAN forwarding. The message sequence 400 transfers command messages such as create conduit (CLA, CLB) messages 410 and 411, create conduit message 412 and 413, acknowledge (ACK) create message 414 and 415, and ACK ACK messages 416 and 417. The create conduit (CLA, CLB) messages 410 and 411 are initiated by the operations described in blocks 360 or 370 depending upon which usage rate was reached first. Dynamic conduit creation is triggered at the intermediate site 408 when traffic throughput between the two sites A 404 and B 406 exceeds a configured traffic first threshold or usage on a local WAN link exceeds a configured usage second threshold within the defined sample time. A dynamic conduit can only be setup between sites that can reach each other directly, which means that sites A 404 and B 406 have the capability to send packets to each other directly without going through the intermediate site. Thus, messages 412 to 417 are sent directly between site A 404 and site B 406, not by way of site 408. The intermediate site 408 manages WAN-to-WAN forwarding between client site A 404 and client site B 406 and keeps throughput statistics on each WAN link at the intermediate site 408. A local WAN link (LWL) at the intermediate site I (site I) 408 can be used by a conduit A/I between client site A 404 and site I 408, or the LWL can be used by a conduit B/I between client site B 406 and site I 408, or the LWL can be used by both conduits A/I and B/I. The usage of the LWL is monitored and includes usage depending on the configuration. For example, the LWL usage may include the usage on conduit A/I, the usage on conduit B/I, thereby providing a usage on both conduits, and may include usage from other conduits that use the LWL or other internet usage or other intranet usage. The purpose of this accounting of usage is to determine if the traffic on the LWL exceeds the second threshold. The second threshold is used to make sure the LWLs are not overused. If an LWL is overused, then top users on the LWL are selected to create a dynamic conduit. If the throughput between client sites A 404 and B 406 using WAN-to-WAN forwarding on each conduit exceeds the configured first threshold, as determined at block 368 of FIG. 3B, or if the LWL traffic usage exceeds the second threshold and the site pair A 404 and B 406 are on the second usage busy list, as determined at block 354 of FIG. 3B, the intermediate site 408 sends create conduit (CLA, CLB) messages 410 and 411 to client sites A 404 and B 406. The creation of a dynamic conduit is initiated by the sending of the conduit creation (CLA, CLB) messages 410 and 411. The create conduit (CLA, CLB) message 410 and 411 are initiated by block 360 or block 370 of FIG. 3B based on which rate was reached. For example, a first determination is made at block 354 whether the LWL usage exceeds the second threshold. If the second threshold rate was reached then at block 360 the create conduit messages are sent. If the second threshold rate was not reached, the process 350 reaches block 368. At block 368, a second determination is made whether the traffic between the two sites that are on the first busy list exceeds the first threshold. If the first threshold rate was reached, the process 350 proceeds to block 370 where the create conduit messages are sent. Every pre-specified time period, such as every 30 seconds or multiple thereof, the intermediate site 408 evaluates each local WAN link usage and traffic between the sites, sends the create conduit request message to the appropriate sites when usage conditions are met.

The create conduit message 410 is received in client site A 404 and the create conduit message 411 is received in client site B 406. Client site A 404 then responds to the message 410 with a create conduit message 412 which is sent to client site B 406. Also, client site B 406 responds to the message 411 with a create conduit message 413 which is sent to client site A 404. Each client site is in a connecting state and separately configures their site, starts a connecting Timer(t0), and reserves resources to support a dynamic conduit. Client site A 404 receives the create conduit message 413 sent from client site B 406 and in a separate transaction, client site B 406 receives the create conduit messages 412 sent from client site A 404. Each client site separately stops their Timer(t0) and creates a dynamic conduit indication that the site is in a conduit created state and which means that all of the necessary data structures in the system have been created and initialized for the new dynamic conduit at both sites. At this time, client site A 404 and client site B 406 don't know if the other site has received the create conduit message or has not received the create conduit message. Also, both client sites, having received a create conduit message, separately start an ACK Timer(t1) and separately respond with an acknowledgement (ACK) create messages 414 and 415 indicating the dynamic conduit has been created and is ready to go at the local sites A 404 and B 406. Prior to the ACK Timer(t1) expiring on client site B 406, the ACK create message 414 sent from client site A 404 is received in client site B 406 and client site B 406 stops the ACK Timer(t1) and starts a conduit down Timer(t2). Also, prior to the ACK Timer (t1) expiring on client site A 404, the ACK create message 415 sent from client site B 406 is received in client site A 404 and client site A 404 stops the ACK Timer(t1) and starts a conduit down Timer(t2). Then, an ACK ACK message 416 is sent from client site A 404 to client site B 406 and an ACK ACK message 417 is sent from client site B 406 to client site A 404. When client site A 404 receives the ACK ACK message 417 from client site B 406, the message is ignored since client site A 404 is in a created state. When client site B 406 receives the ACK ACK message 416 from client site A 404, the message is ignored since client site B 406 is in the created state. However, after each site receives an ACK ACK message, each client site knows that both ends of the dynamic conduit have been created. Thus, normal conduit control traffic is sent on the newly created dynamic conduit to try and bring the conduit up to a normal level of operating performance. Also, every messages received over the newly created dynamic conduit causes the client site's Timer(t2) to be restarted.

Once the dynamic conduit is initially created at both sites A 404 and B 406, it is considered in a "down" state. The normal conduit control traffic is then sent and assuming the conduit control traffic is received and processed normally, the dynamic conduit transitions to an "up" state. A dynamic conduit on bring up operates in a similar manner to a static conduit between two sites, beginning in a "down" state and when operating with minimal to no loss on conduit control traffic, transitions to the "up" state. However, an "up" state is not considered a fully operational state. To reach a fully operational state, the dynamic conduit is required to go through a grow process, as covered in more detail with regard to FIG. 5B, to make sure the newly created dynamic conduit is operating correctly. Once the dynamic conduit passes the grow process, the newly created dynamic conduit is considered in operation. Another embodiment addresses a method for growing communication capacity in the presence of multiple site pairs contending for dynamic conduit resources. The decision to create a dynamic conduit is best decided by an intermediate site because the intermediate site has a better view of its local WAN link (LWL) usages, and can use a dynamic conduit to offload, or transfer, those LWLs that are most congested. The intermediate site selects site pairs that are busiest, have the highest usage, to let the site pairs talk directly over a dynamic conduit. In this manner, the congestion at the intermediate site is reduced. As described in more detail below, a dynamic conduit may be created between a second two sites by a user request. Such a user request may be advantageous for purposes of testing performance of a dynamic conduit, of debugging communication problems between the second two sites, or to set up a dynamic conduit before an event, for example.

Figure 4B:
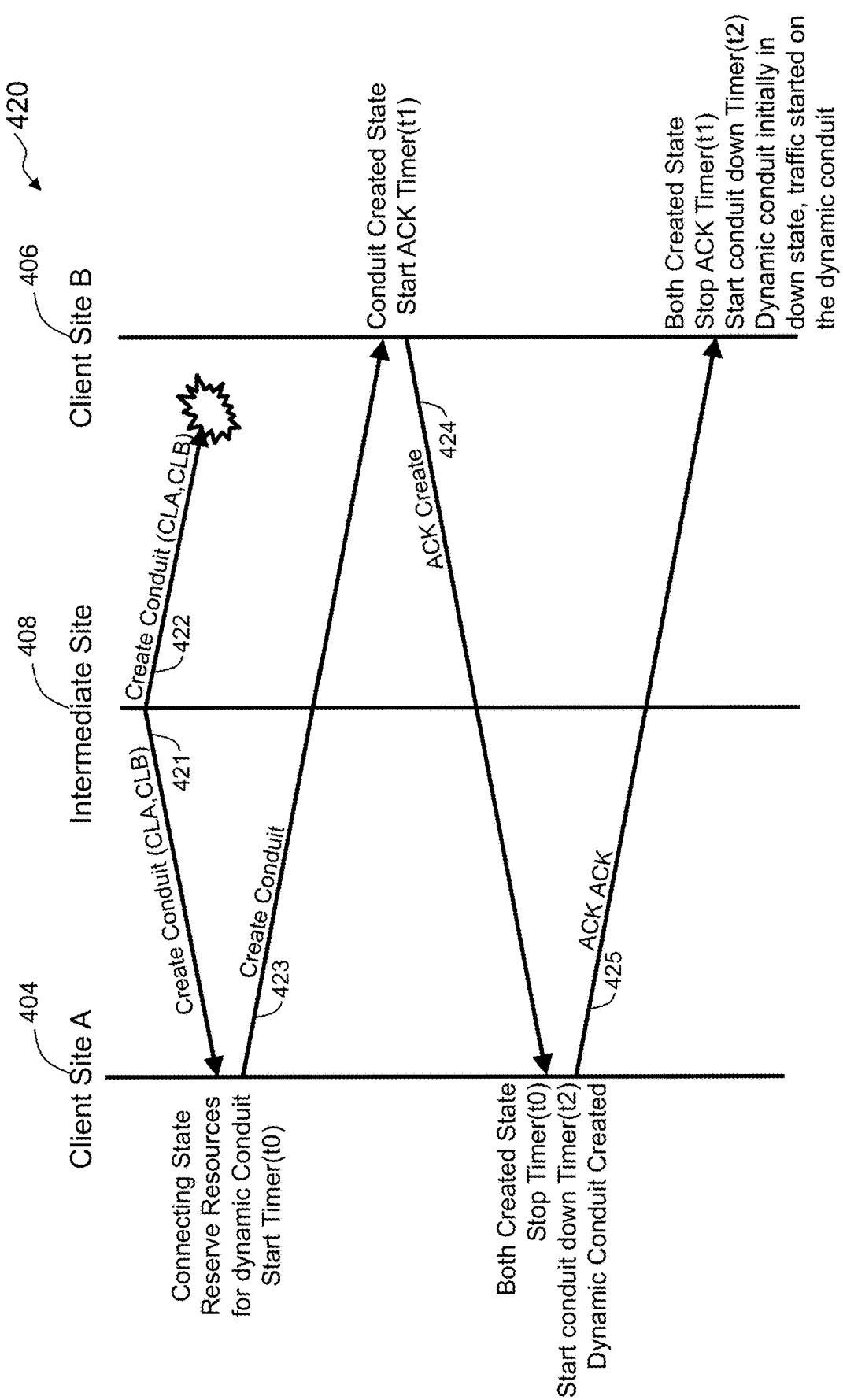
FIG. 4B illustrates a first event message sequence that responds to a lost message in a dynamic conduit creation process in accordance with the present invention.

FIG. 4B illustrates a first event message sequence 420 that responds to a lost message in a dynamic conduit creation process in accordance with the present invention. After the intermediate site 408 evaluates each local WAN link usage and traffic between the sites A 404 and B 406 and determines that usage conditions are met, the create conduit (CLA, CLB) messages 421 and 422 are sent. The create conduit (CLA, CLB) messages 421 and 422 are initiated by block 360 or block 370 of FIG. 3B based on which threshold was reached as shown in process 350 of FIG. 3B and as described above with regard to FIG. 4A. The create conduit (CLA, CLB) message 421 is received in client site A 404 and resources to support a dynamic conduit are reserved in client site A 404. However, the create conduit (CLA, CLB) message 422 is not received in client site B 406, possibly due to a connection problem.

A create conduit message is issued to create a conduit instance in software that represents creation and initialization of the data structures necessary for the creation of a dynamic conduit at a receiving site. Each site can only reserve a certain amount of resources for use by a dynamic conduit that is created in response to the create conduit message. The reserved resources are assigned to the conduit instance created and are not available to be used by another conduit. This reserved resources and assignment is to ensure that when the site with the reserved resources receives an ACK from a remote site, it can use the reserved resources to create the dynamic conduit. As a general rule, any site that would send out a create conduit message must first ensure it has sufficient resource to support a dynamic conduit. One reason why a site would not create a dynamic conduit right after receiving the create conduit message from an intermediate site is that the create conduit message requires a significant amount of processing in the software, and if a remote site runs out of resource, the local site has to tear the conduit down. So, a first step to create a dynamic conduit is to always reserve sufficient resources, make sure a remote site also has sufficient resources to create the dynamic conduit, and then proceed with the steps to create the dynamic conduit.

The client site A 404 having received the create conduit (CLA, CLB) message 421 responds with a create conduit message 423 sent to client site B 406 and starts Timer(t0) and client site A 404 is in a connecting state. Client site B 406 responds to the received create conduit message 423 with an acknowledgement (ACK) create message 424 indicating the dynamic conduit has resources at site B 406 and starts an ACK Timer(t1). When site B 406 received the create conduit message from site A 404, site B 406 knows site A 404 is fine to create the dynamic conduit, site B 406 proceeds with reserving the necessary resources, and creates the conduit instance at site B 406. Client site B 406 is in a conduit created state. When client site A 404 receives the ACK message 424, client site A 404 sets up the dynamic conduit, stops Timer(t0), starts Timer(t2), and responds with an ACK ACK message 425 to client site B 406. Client site A 404 is now in a both created state. At client site B 406, the ACK Timer(t1) is stopped and a Timer(t2) is started. The dynamic conduit is created between client sites A 404 and B 406 with client site B 406 in a both created state. Advantageously, if any one message is lost, as shown with create conduit (CLA, CLB) 422 that is lost, the dynamic conduit can still be created providing resilience to packet loss. The created dynamic conduit is initially in a down state with control traffic started to bring it to an up state and from there to grow to full traffic operations.

Figure 4C:
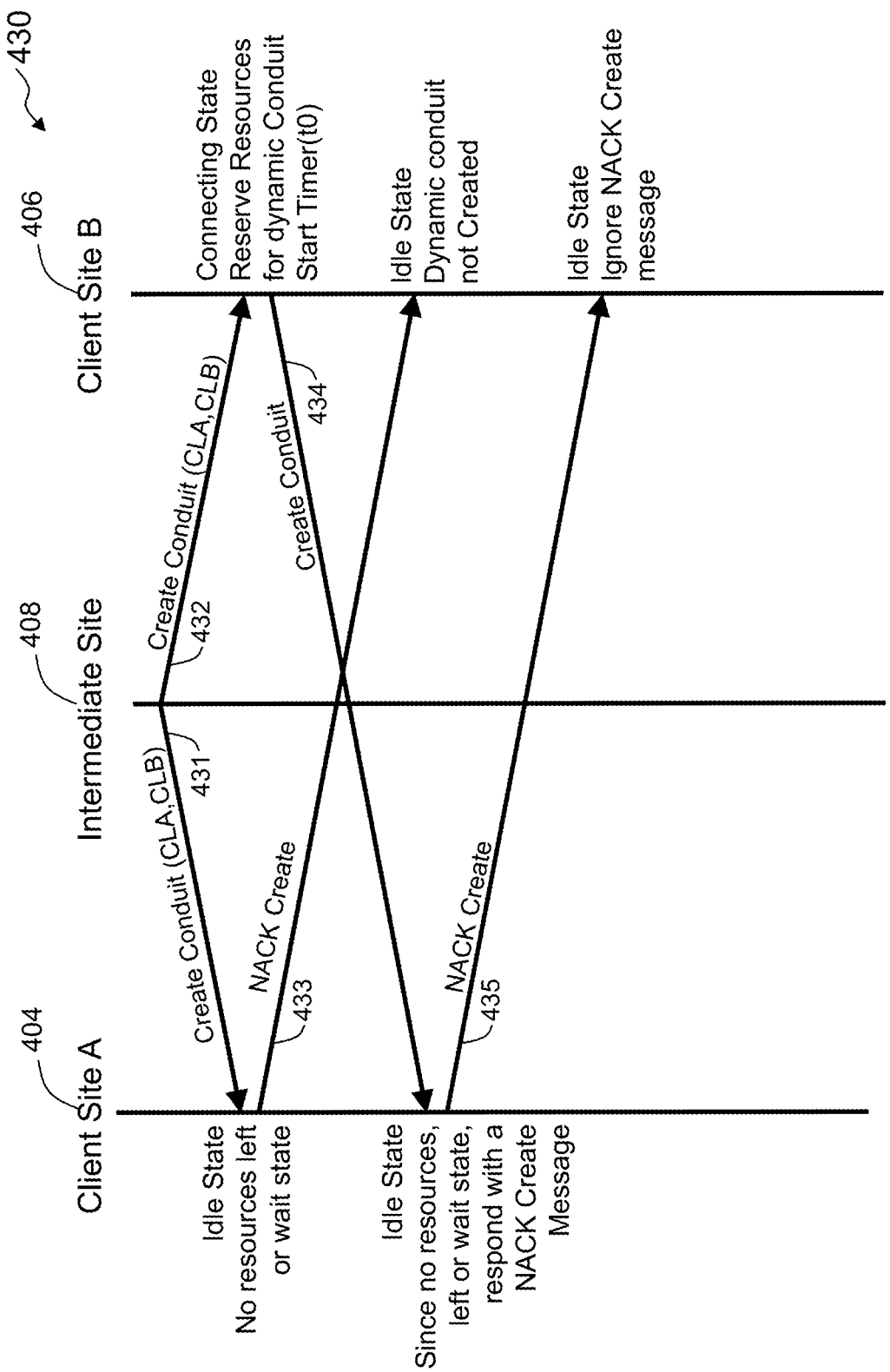
FIG. 4C illustrates a second event message sequence that responds to a first client site rejection of a conduit creation message in accordance with the present invention.

FIG. 4C illustrates a second event message sequence 430 that responds to a first client site rejection of a conduit creation message in accordance with the present invention. After the intermediate site 408 evaluates each local WAN link usage and traffic between the sites A 404 and B 406 and determines that usage conditions are met, the create conduit (CLA, CLB) messages 431 and 432 are sent. The create conduit (CLA, CLB) messages 431 and 432 are initiated by block 360 or block 370 of FIG. 3B based on which threshold was reached as shown in process 350 of FIG. 3B and as described above with regard to FIG. 4A. The create conduit (CLA, CLB) message 431 is received in client site A 404 and client site A determines that it has insufficient resources available to support a dynamic conduit or is in a wait state.

Since client site A 404 has insufficient resources or is in a wait state, client site A sends a not-acknowledged (NACK) create message 433 to client site B 406 and client site A 404 is in an idle state. The create conduit (CLA, CLB) message 432 is received in client site B 406 and resources to support a dynamic conduit are reserved in client site B 406. The client site B 406, having received the create conduit (CLA, CLB) message 432, responds with a create conduit message 434 sent to client site A 404. Client site B 406 configures site B, starts a connecting Timer(t0), reserves resources to support a dynamic conduit and is in a connecting state. Client site B 406 receives the NACK create message 433 and transitions to an idle state. No dynamic conduit is created at client site B 406. Client site A 404 responds to the received create conduit message 434 with a second not-acknowledged (NACK) create message 435 indicating the client site A is not able to set up the dynamic conduit since it has no resources left or is in a wait state. Client site A 404 remains in the previous idle state or wait state. Client site B 406 ignores the NACK create message 435 and remains in the idle state. The dynamic conduit is not created between client sites A 404 and B 406.

Figure 4D:
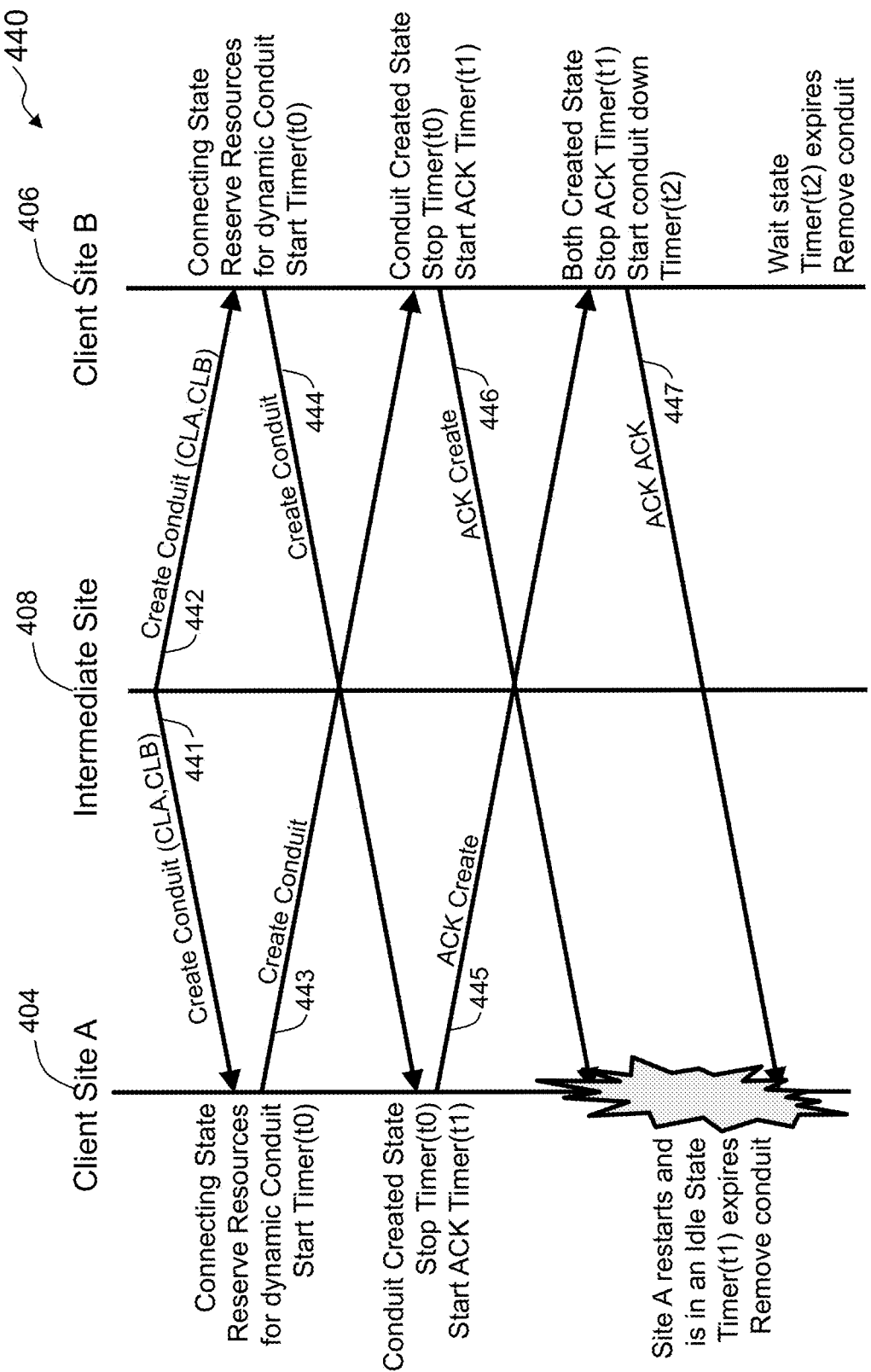
FIG. 4D illustrates a third event message sequence that responds to a first client site restart event leading to removal of a dynamic conduit after a t2 timeout in accordance with the present invention.

FIG. 4D illustrates a third event message sequence 440 that responds to a first client site restart event leading to removal of a dynamic conduit after a t2 timeout in accordance with the present invention. After the intermediate site 408 evaluates each local WAN link usage and traffic between the sites A 404 and B 406 and determines that usage conditions are met, the create conduit (CLA, CLB) messages 441 and 442 are sent. The create conduit (CLA, CLB) messages 441 and 442 are initiated by block 360 or block 370 of FIG. 3B based on which threshold was reached as shown in process 350 of FIG. 3B and as described above with regard to FIG. 4A. The create conduit (CLA, CLB) message 441 is received in client site A 404, a Timer(t0) is started, and resources to support a dynamic conduit are reserved in client site A 404. Client site A 404 is in a connecting state. The create conduit (CLA, CLB) message 442 is received in client site B 406, a Timer(t0) is started, and resources to support a dynamic conduit are reserved in client site B 406. Client site B 406 is in a connecting state. The client site A 404 having received the create conduit (CLA, CLB) message 441 responds with a create conduit message 443 sent to client site B 406. The client site B 406 having received the create conduit (CLA, CLB) message 442 responds with a create conduit message 444 sent to client site A 404.

Each client site configures the site and reserves resources to support a dynamic conduit. After client site A 404 receives the create conduit message 444 sent from client site B 406 and in a separate transaction, client site B 406 receives the create conduit messages 443 sent from client site A 404. Each client site separately creates the dynamic conduit at both sites. Also, each client site separately stops Timer(t0), starts an ACK Timer(t1), and responds with an acknowledgement (ACK) create message 445 and 446 indicating the dynamic conduit is created and is ready to go. Both client site A 404 and client site B 406 are in a conduit created state. Prior to the ACK Timer(t1) expiring at client site B 406, the ACK create message 445 is received at client site B 406, the ACK Timer(t1) is stopped, a conduit down Timer(t2) is started, and an ACK ACK message 447 is sent from client site B 406 to client site A 404. Client site A 404 did not receive the ACK create message 446 sent from client site B 406 possibly due to a client site A lockup or crash requiring a reboot. Since client site A 404 is restarted, it would have no knowledge of the dynamic conduit and would be in an idle state after the reboot. Also, client site A 404 did not receive the ACK ACK message 447 sent from client site B 406 most likely due to the same restart and reboot sequence. At client site B 406, no ACK ACK message was received from client site A 404 so the conduit down Timer(t2) expires and the conduit created after receiving the create conduit message 443 is removed. Client site B 406 transitions to a wait state or idle state for Timer(t6). Client site B 406 waits till Timer(t6) expires before sending a dynamic conduit creation message to client site A 404 if a create conduit message is received from intermediate site 408. In FIG. 4D, at this point in the sequence, a create conduit message is not received from the intermediate site 408. The dynamic conduit is not created between client sites A 404 and B 406.

Figure 4E:
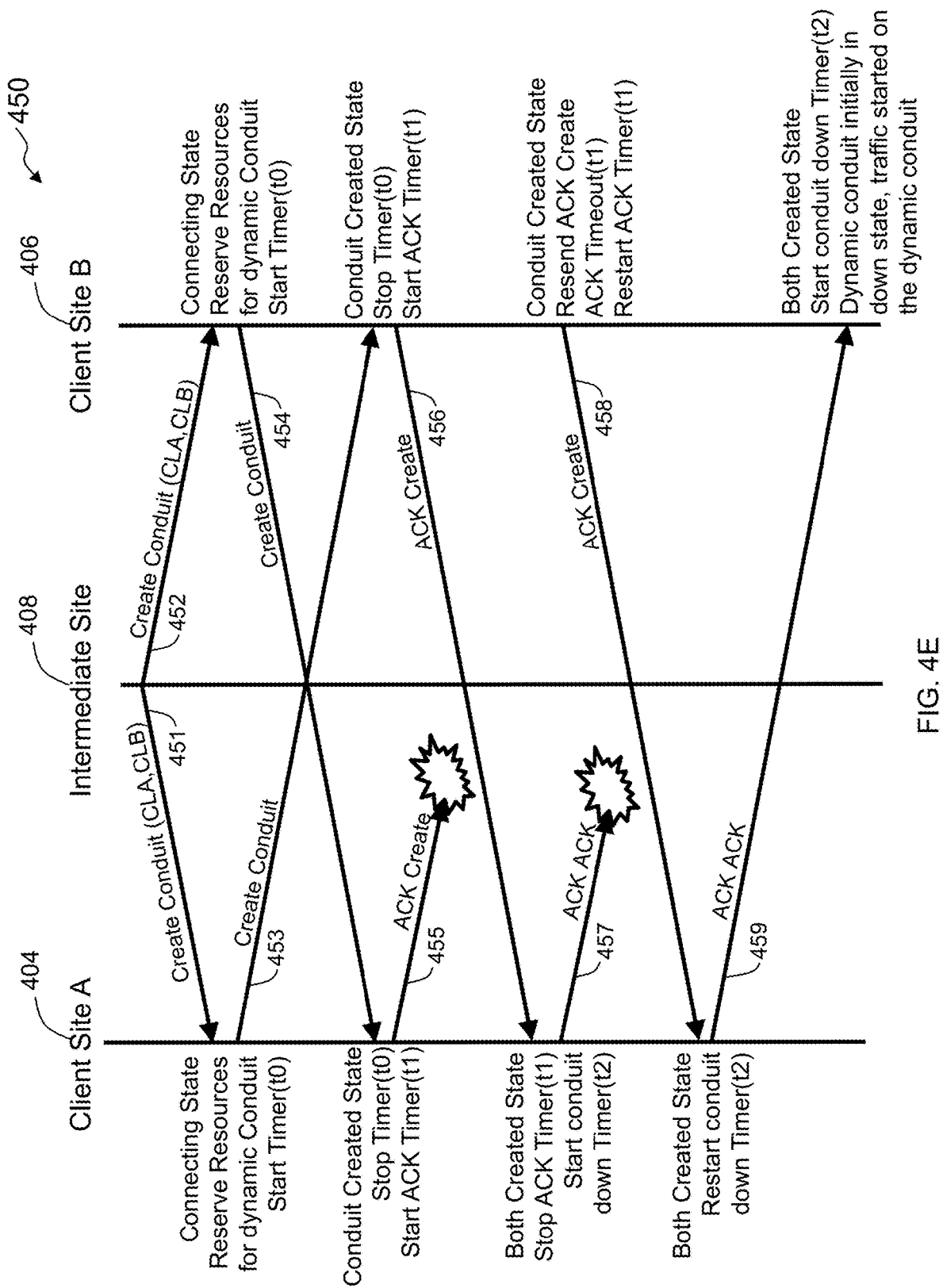
FIG. 4E illustrates a fourth event message sequence that responds to a retransmission of an acknowledgement (ACK) when it is not acknowledged in accordance with the present invention.

FIG. 4E illustrates a fourth event message sequence 450 that responds to a retransmission of an acknowledgement (ACK) when it is not acknowledged in accordance with the present invention. After the intermediate site 408 evaluates each local WAN link usage and traffic between the sites A 404 and B 406 and determines that usage conditions are met, create conduit (CLA, CLB) messages 451 and 452 are sent. The create conduit (CLA, CLB) messages 451 and 452 are initiated by block 360 or block 370 of FIG. 3B based on which threshold was reached as shown in process 350 of FIG. 3B and as described above with regard to FIG. 4A. The create conduit (CLA, CLB) message 451 is received in client site A 404, a Timer(t0) is started, and resources to support a dynamic conduit are reserved in client site A 404. Client site A 404 is in a connecting state. The create conduit (CLA, CLB) message 452 is received in client site B 406, a Timer(t0) is started, and resources to support a dynamic conduit are reserved in client site B 406. Client site B 406 is in a connecting state. The client site A 404 having received the create conduit (CLA, CLB) message 451 responds with a create conduit message 453 sent to client site B 406. The client site B 406 having received the create conduit (CLA, CLB) message 452 responds with a create conduit message 454 sent to client site A 404.

Each client site configures the site and reserves resources to support a dynamic conduit. After client site A 404 receives the create conduit message 454 sent from client site B 406 and in a separate transaction, client site B 406 receives the create conduit messages 453 sent from client site A 404. Each client site separately creates the dynamic conduit at both sites. Also, each client site separately stops Timer(t0), starts an ACK Timer(t1), and responds with an acknowledgement (ACK) create message 455 and 456 indicating the dynamic conduit is created and is ready to go. Both client site A 404 and client site B 406 are in a conduit created state. Prior to the ACK Timer (t1) expiring on client site A 404, the ACK create message 456 sent from client site B 406 is received in client site A 404 and client site A 404 stops the ACK Timer(t1) and starts a conduit down Timer(t2). Client site A 404 is in a both created state. Client site A 404 responds to the ACK message 456 with an ACK ACK message 457 which is sent to client site B 406. The ACK create message 455 sent from client site A 404 is not received at client site B 406 possibly due to a connection problem. Also, the ACK ACK message 457 sent from client site A 404 is not received at client site B 406 possibly due to a connection problem. On client site B 406, when the ACK Timer(t1) times out, the ACK create message 456 is resent as ACK create message 458 to client site A 404 and the ACK Timer(t1) is restarted. Client site B 406 remains in the conduit created state. Prior to the conduit down Timer (t2) timing out, client site A 404 receives the ACK create message 458 from client site B 406, restarts the conduit down Time(t2), and responds with an ACK ACK message 459. Client site A remains in the both created state. Even though client site B 406 did not receive the ACK create message 455, client site B 406 upon receiving the ACK ACK message 459 from client site A 404, still initiates the dynamic conduit operations, stops ACK Timer(t1), and starts the conduit down Timer(t2). Client site B 406 transitions to a both created state.

Figure 4F:
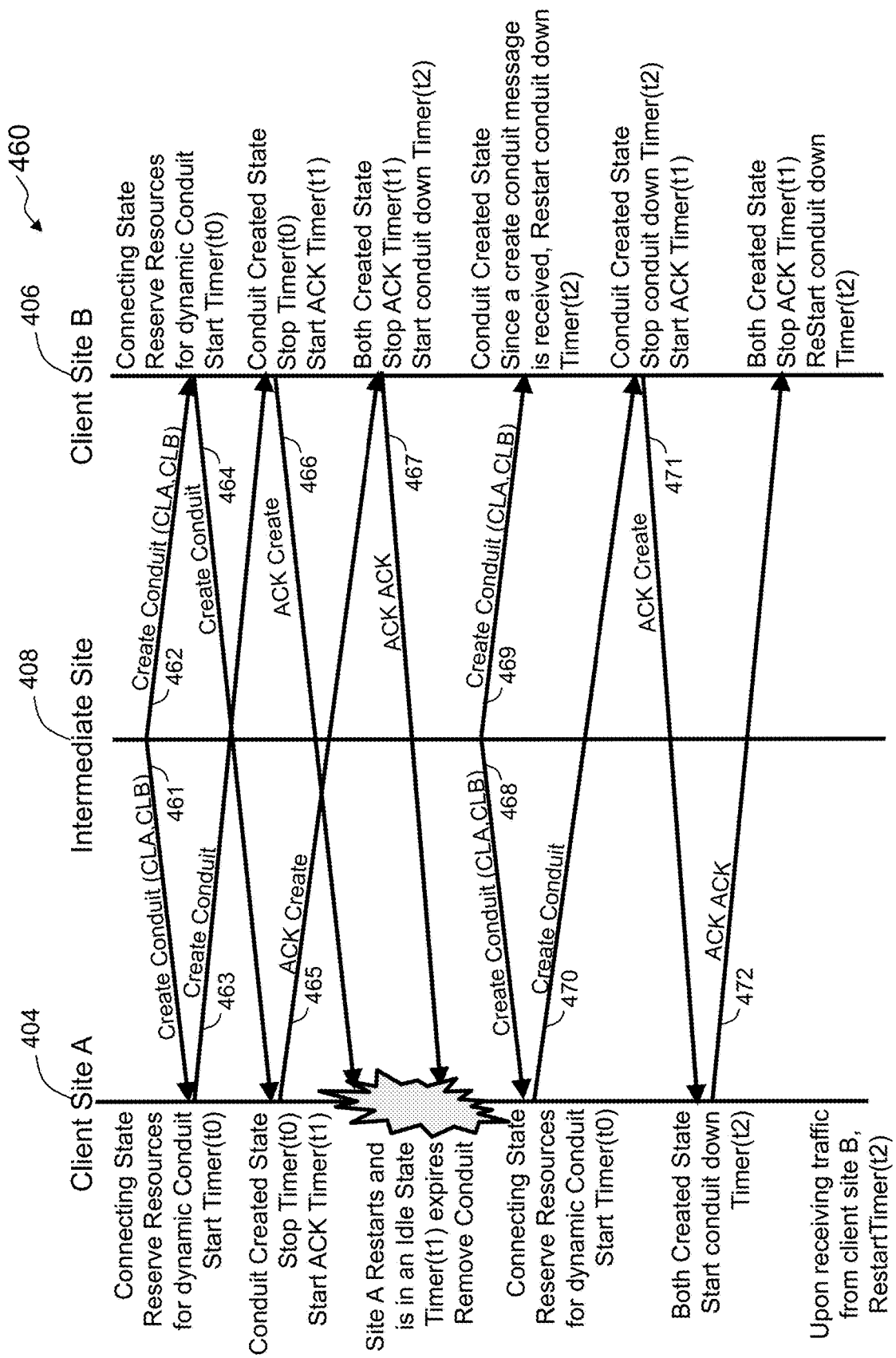
FIG. 4F illustrates a fifth event message sequence that responds to a first client restart leading to removal of a dynamic conduit before the t2 timeout in accordance with the present invention.
Figure 4G:
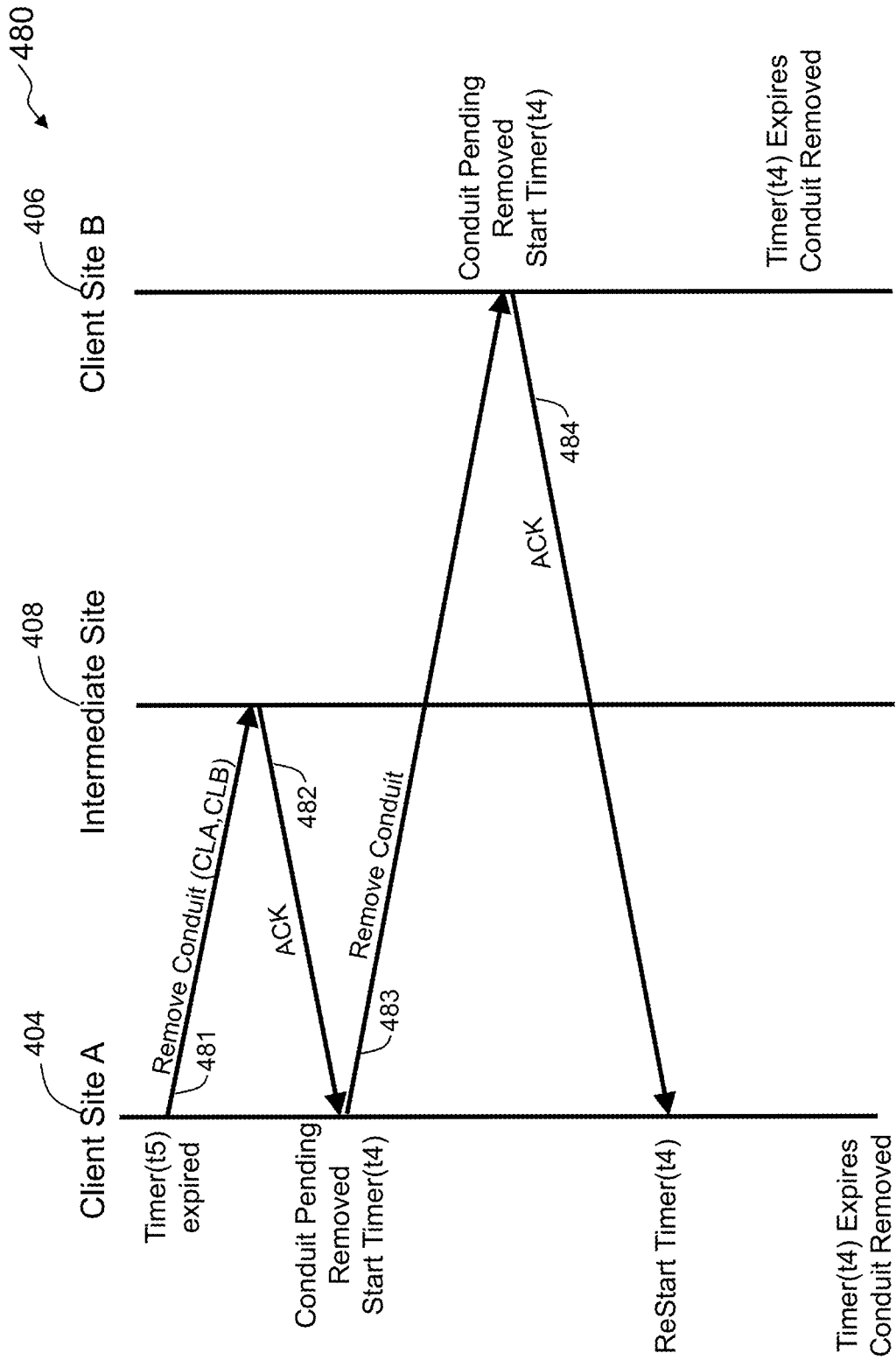
FIG. 4G illustrates a sixth event message sequence that responds to a low usage event in a dynamic conduit with an intermediate client site approving removal of the dynamic conduit in accordance with the present invention.

FIG. 4F illustrates a fifth event message sequence 460 that responds to a first client restart leading to removal of a dynamic conduit before the Timer(t2) timeout in accordance with the present invention. After the intermediate site 408 evaluates each local WAN link usage and traffic between the sites A 404 and B 406 and determines that usage conditions are met, the create conduit (CLA, CLB) messages 461 and 462 are sent. The create conduit (CLA, CLB) messages 461 and 462 are initiated by block 360 or block 370 of FIG. 3B based on which threshold was reached as shown in process 350 of FIG. 3B and as described above with regard to FIG. 4A. The create conduit (CLA, CLB) message 461 is received in client site A 404, Timer(t0) is started, and resources to support a dynamic conduit are reserved in client site A 404. Client site A 404 is in a connecting state. The create conduit (CLA, CLB) message 462 is received in client site B 406, Timer(t0) is started, and resources to support a dynamic conduit are reserved in client site B 406. Client site B 406 is in a connecting state. The client site A 404 having received the create conduit (CLA, CLB) message 461 responds with a create conduit message 463 sent to client site B 406. The client site B 406 having received the create conduit (CLA, CLB) message 462 responds with a create conduit message 464 sent to client site A 404.

Each client site configures the site and reserves resources to support a dynamic conduit. After client site A 404 receives the create conduit message 464 sent from client site B 406 and in a separate transaction client site B 406 receives the create conduit messages 463 sent from client site A 404. Each client sites separately create the dynamic conduit at both sites. Also, each client sites separately stops Timer(t0), starts an ACK Timer(t1), and responds with an acknowledgement (ACK) create message 465 and 466 indicating the dynamic conduit is created and is ready to go. Both client site A 404 and client site B 406 are in a conduit created state. Prior to the ACK Timer(t1) expiring at client site B 406, the ACK create message 465 is received at client site B 406, the ACK Timer(t1) is stopped, a conduit down Timer(t2) is started and an ACK ACK message 467 is sent from client site B 406 to client site A 404. Client site B 406 is in a both created state. Client site A 404 did not receive the ACK create message 466 sent from client site B 406 possibly due to a client site A lockup or crash requiring a reboot. Since client site A 404 is restarted, it would have no knowledge of the dynamic conduit and would be in an idle state after the reboot. Client site A 404 also did not receive the ACK ACK message 467 sent from client site B 406 most likely due to the same restart and reboot sequence. The intermediate site 408 determines that the local WAN link usage and traffic between client site A 404 and B 406 has met the usage conditions to trigger the creation of a dynamic conduit. The intermediate site 408 does not know whether a restart has been done on client site A 404. Rather, the intermediate site 408 determines when to initiate a dynamic conduit based on the traffic that is flowing through it. Also, the intermediate site 408 does not generally keep state about whether it has previously requested a dynamic conduit to be created.

The intermediate site 408, at next sample cycle, such as governed by block 376 of FIG. 3B, determines that the usage between client site A 404 and client site B 406 still exceeds the usage second threshold and in response, restarts the dynamic conduit creation process by sending create conduit (CLA, CLB) messages 468 and 469. The create conduit (CLA, CLB) messages 468 and 469 are initiated by block 360 or block 370 of FIG. 3B based on which threshold was reached as shown in process 350 of FIG. 3B and as described above with regard to FIG. 4A. The create conduit (CLA, CLB) message 469 is received in client site B 406 and since the dynamic conduit is already created at client site B 406, the conduit down Timer(t2) is restarted. Client site B transitions to the conduit created state. The create conduit (CLA, CLB) message 468 is received in client site A 404 and resources to support a dynamic conduit are reserved in client site A 404. The client site A 404 having received the create conduit (CLA, CLB) message 468 responds with a create conduit message 470 sent to client site B 406. Client site A 404 is in a connecting state. Client site B 406 upon receiving the create conduit message 470 stops the conduit down Timer(t2), starts an ACK Timer(t1), and sends an ACK create message 471 to client site A 404. Client site B 406 remains in the conduit created state. Client site A 404 upon receiving the ACK create message 471, starts the ACK Timer(t1), sends an ACK ACK message 472, and posts that the dynamic conduit has been created at client site A 404. Client site A 404 transitions to a both created state. Client site B 406, upon receiving the ACK ACK message 472, stops the ACK Timer(t1), starts conduit down Timer(t2), posts that the dynamic conduit has been created at client site B 406, and initiates the dynamic conduit operations. Client site B 406 transitions to the both created state. Messages received over the newly created dynamic conduit cause the Timer(t2) to be restarted. Conduit control packets are sent and the dynamic conduit is brought to an "up" state, assuming acceptable operation characteristic occur during message transfers on the dynamic conduit.

FIG. 4G illustrates a sixth event message sequence 480 that responds to a low usage event in a dynamic conduit with an intermediate client site approving removal of the dynamic conduit in accordance with the present invention. A dynamic conduit between two sites may be removed if the dynamic conduit is down for more than a first configured time, as specified by a conduit down Timer(t2) expiring. The dynamic conduit may also be removed if there is no data traffic on the dynamic conduit for more than a second configured time, as specified by a data traffic Timer(t5) expiring. The dynamic conduit may also be removed there is low usage on the conduit. Further, the dynamic conduit may be removed upon the intermediate site 408 receiving a request for removal of the dynamic conduit by one of the client sites and the intermediate site 408 agrees to remove the dynamic conduit.

A configured tear down threshold is used at client sites, such as a client site A 404 and a client site B 406 as shown in FIG. 4G. After a configured data traffic Timer(t5) has expired at client site A 404 for example, the client site A 404 checks if its bits per second (bps) and or packets per second (pps) usage is lower than the configured tear down threshold. If the client site A's usage is lower than the configured tear down threshold, the client site A 404 sends a message, such as message 481 described below, to the intermediate site 408 that requests permission to remove an already set up dynamic conduit. Then intermediate site 408 uses process 700 of FIG. 7 to decide whether to allow or to disallow the removal of the dynamic conduit. The remove conduit process 700 is described in more detail with regard to FIG. 7 below.

In FIG. 4G, client site A 404 requests removal of a dynamic conduit between sites A 404 and B 406 by sending a remove conduit (CLA, CLB) message 481 to the intermediate site 408. The intermediate site 408 upon receiving the remove conduit (CLA, CLB) message 481, reviews the current WAN link usage between the sites A 404 and B 406 that was included in the remove conduit (CLA, CLB) message 481. The intermediate site 408 has the current local WAN link usage data from the calculations that are used in the process 300 of FIG. 3A and the process 350 of FIG. 3B and adds the current WAN link usage between sites A and B from the message 481 to each local WAN link usage. The intermediate site 408 determines whether the WAN link usage that includes the usage of the dynamic conduit exceeds a configured second threshold bps2/pps2 for any of the local WAN links. When usage exceeds the configured second threshold, the intermediate site 408 sends out a not acknowledged (NACK) message to the site requesting the dynamic conduit removal. The dynamic conduit between sites A 404 and B 406 remains in place. However, if the WAN link usage that includes the usage of the dynamic conduit does not exceed the configured second threshold for any of the local WAN links, the intermediate site 408 sends out an ACK message 482 to the site requesting the removal of the dynamic conduit, client site A 404 in this scenario shown in FIG. 4G. This indicates that the intermediate site 408 is able to handle the increased usage that was originally on the dynamic conduit.

Client site A 404 upon receiving the ACK 482, starts a Timer (t4), and send a remove conduit request message 483 to the associated peer site, client site B 406. Timer(t4) is a conduit remove pending timer that is started after sending out a remove conduit message to a peer client site. A configured timeout value is set up on the order of two seconds for the peer client to acknowledge (ACK) the removal request and an additional two or three seconds by restarting the Timer(t4) to let all packets for the conduit drain out before actually removing the conduit instance in the software and APN. If client site B 406 sends a not acknowledged (NACK) message, client site A 404 sets a dynamic conduit don't remove conduit flag, but does not remove the dynamic conduit. In one aspect, the don't remove conduit flag is used for debug purposes, since the originally created conduit would have been removed at this point making it difficult to debug problems associated with communications between client site A 404 and client site B 406. The conduit is available for debug at this point, due to the don't remove conduit flag being set active, allowing time to debug a problem with communication across the conduit. If client site B 406 does not respond with an ACK or with a NACK, and after the Timer(t4) expires, client site A 404 posts that the dynamic conduit is removed. Client site B 406, upon receiving the remove conduit message 483 from client site A 404, removes the dynamic conduit from a routing table on client site B 406, starts a second Timer(t4), and acknowledges the request to remove the conduit by an ACK message 484. Client site A 404 removes the dynamic conduit from a routing table on client site A 404, restarts Timer(t4) with a 5 second timeout for example, in response to receiving the ACK message 484. After the Timer(t4) expires on each site, the dynamic conduit is removed.

Generally, when the dynamic conduit is down from more than the configured time based on Timer(t2) expiring in each client site A 404 and B 406, the dynamic conduit is posted as removed since no user traffic can be sent on a dynamic conduit that is down. When there is no data traffic on the dynamic conduit for more than a second configured time, as determined by a data traffic Timer(t5) expiring, one or both client sites A 404 and or client site B 406 removes the dynamic conduit from a routing table, start a Timer(t4), and send a remove conduit request to the associated peer site. Since the dynamic conduit is down, after Timer(t4) expires the dynamic conduit is removed from a routing table on both client sites. If the peer site acknowledges the request by an ACK message, the site that sent the remove conduit message posts that the dynamic conduit is removed. If the peer site sends a not acknowledged (NACK) message, the site that sent the remove conduit message sets a dynamic conduit don't remove conduit flag, but does not remove the dynamic conduit so that it is available for debug purposes. If the peer site does not respond with an ACK or with a NACK, and after the Timer(t4) expires, the site that sent the remove conduit message posts that the dynamic conduit is removed.

Figure 5A:
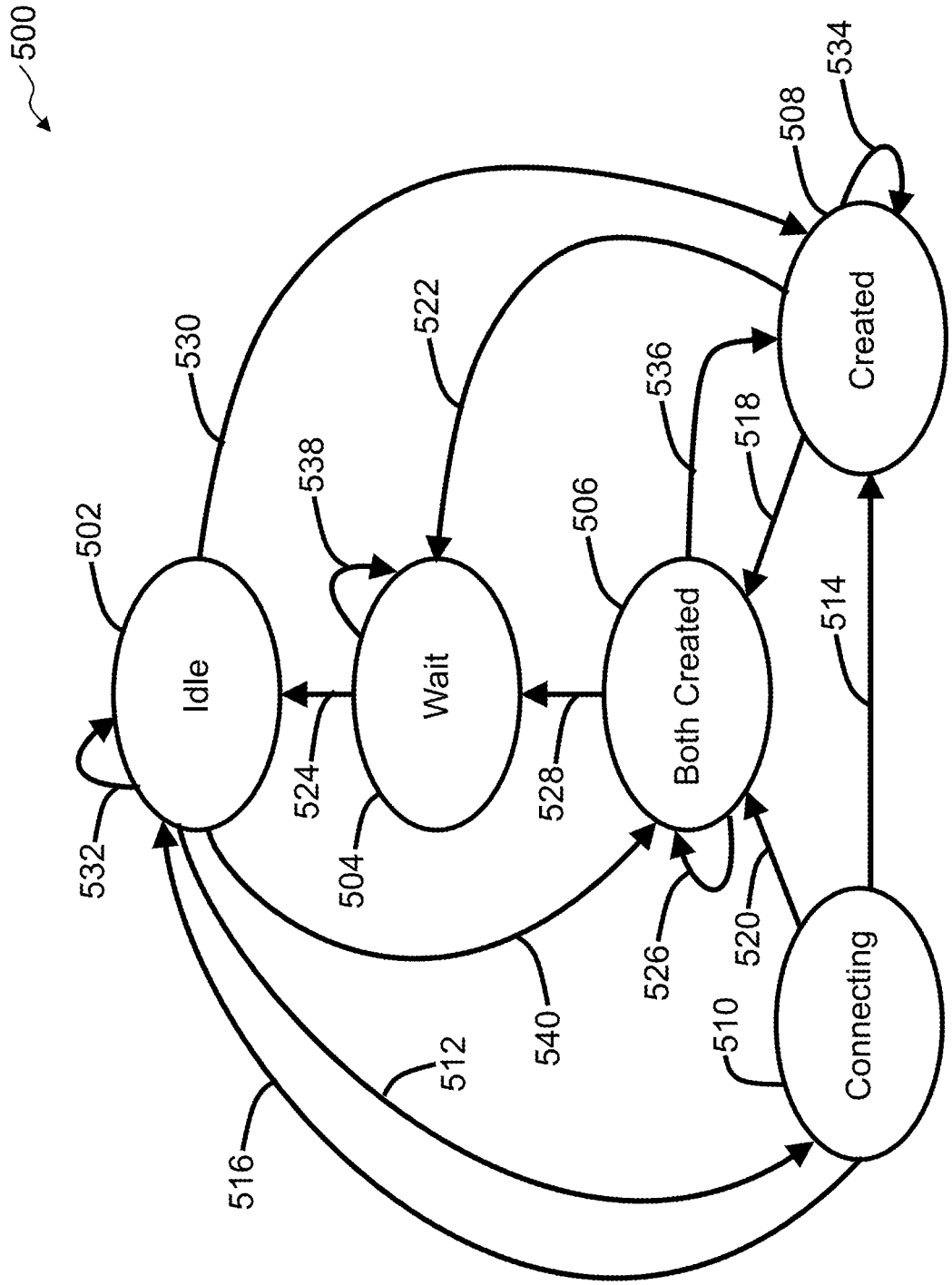
FIG. 5A illustrates an exemplary first state machine at a client site in accordance with the present invention.

FIG. 5A illustrates an exemplary first state machine 500 and FIG. 5B illustrates an exemplary second state machine 550 which in another embodiment may be configured together as a single state machine. FIG. 5A addresses a dynamic conduit setup, FIG. 5B addresses a dynamic conduit grow, use, and tear down processes. For FIG. 4A to 4F, FIGS. 5A and 5B cover the dynamic conduit setup.

FIG. 5A illustrates the exemplary first state machine 500 at a client site in accordance with the present invention. The first state machine 500 is described in relationship to FIGS. 4A-4F and operates as a first state machine in client site A 404 and as a first state machine in client site B 406. The dynamic conduit creation process is described initially from the perspective of client site A 404. The first state machine 500 is comprised of an idle state 502, a wait state 504, a both created state 506, a created state 508, and a connecting state 510. The first state machine 500 is initialized to the idle state 502.

Regarding the create dynamic conduit message sequence 400 of FIG. 4A, a create conduit (CLA, CLB) message 410 is received in client site A 404 from the intermediate site 408 which reserves resources, starts Timer(t0), transmits the create conduit message 412 to the client site B 406, and causes transition 512 be made from the idle state 502 to the connecting state 510. If the Timer(t0) expires before receiving any message from a peer client, a transition 516 is made back to the idle state 502. While in the connecting state 510 and the Timer(t0) still in operation, a create conduit message 413 is received in the client site A 404 from the client site B 406 which creates the conduit at client site A 404, stops Timer(t0), starts Timer(t1), transmits the ACK create message 414 to the client site B 406, and makes transition 514 from the connecting state 510 to the created state 508. While in the created state 508, an ACK create message 415 is received in the client site A 404 from client site B 406 which stops Timer(t1), starts Timer(t2), transmits an ACK ACK message 416 to the client site B 406, and makes transition 518 to the both created state 506. While in the both created state 506, an ACK ACK message 417 is received in client site A 404 from the client site B 406 and Timer(t2) is restarted. Client site A 404 sends normal conduit control traffic to client site B 406 to bring up the conduit. If the conduit is not up after Timer(t2) expires or if the conduit has a don't remove conduit flag active, then the Timer(t2) is restarted. If the conduit's don't remove conduit flag is inactive, the system transitions to wait state 504. While in the wait state 504, if a create conduit (CLA, CLB) message, such as message 410 of FIG. 4A, is sent from the intermediate site 408, a NACK create message will be returned making transition 538 and remaining in the wait state 504. Also, while in the wait state 504, if a create conduit message is received from the peer node, a NACK create message will be returned making transition 538 and remaining in the wait state 504. While in the both created state 506, the dynamic conduit is initially in a down state, but client site A 404 and client site B 406 begin to send the normal conduit control traffic to bring up the conduit and once the conduit is considered "up", the conduit transitions to a grow state, such as conduit grow state 552 of FIG. 5B.

Regarding the first event message sequence 420 that responds to a lost message of FIG. 4B, a create conduit (CLA, CLB) message 421 is received in client site A 404 from the intermediate site 408 which starts Timer(t0), transmits the create conduit message 423 to the client site B 406, and causes transition 512 be made from the idle state 502 to the connecting state 510 in client site A 404. Client site B 406 not having received the create conduit (CLA, CLB) message 421 is in the idle state 502 when it receives the create conduit message 423 which causes Client site B 406 to transition 530 to the created state 508. Client site B 406 issues the ACK create message 424. Back in Client site A 404, if the Timer(t0) expires before receiving any message from a peer client, a transition 516 is made back to the idle state 502. While client site A 404 is in the connecting state 510 and the Timer(t0) still in operation, an ACK create message 424 is received in client site A 404 from client site B 406, which causes client site A 404 to create the conduit, stops Timer(t0), starts Timer(t2), transmits an ACK ACK message 425 to the client site B 406, and makes transition 520 from the connecting state 510 to the both created state 506. Client site B 406 upon receiving the ACK ACK message 425 transitions to the both created state 506, stops Timer(t1), and starts Timer(t2). While client site A 404 and client site B 406 are both in the created state 506, the dynamic conduit is initially in a down state, which generally changes with normal control traffic to reach an "up" state, and then transitions to a grow state.

Regarding the second event message sequence 430 that responds to a first client site rejection of a conduit creation message of FIG. 4C, a create conduit (CLA, CLB) message 431 is received in client site A 404 from the intermediate site 408 and client site A determines that it has insufficient resources available to support a dynamic conduit, the system remains in the idle state 502, and on transition 532 sends a NACK create message to client site B 406. A create conduit message 433 is received in client site A 404 from client site B 406. Client site A 404 responds to the received create conduit message 433 with a not acknowledged (NACK) create message 434 indicating the client site A is not able to set up the dynamic conduit. The dynamic conduit is not created between client sites A 404 and B 406.

Regarding the third event message sequence 440 that responds to a first client site restart leading to removal of a dynamic conduit after Timer(t2) timeout of FIG. 4D, the create conduit (CLA, CLB) message 441 is received in client site A 404 from the intermediate site 408 which starts Timer(t0), transmits the create conduit message 443 to the client site B 406, and causes transition 512 be made from the idle state 502 to the connecting state 510. If the Timer(t0) expires before receiving any message from a peer client, a transition 516 is made back to the idle state 502. While in the connecting state 510 and the Timer(t0) still in operation, a create conduit message 444 is received in the client site A 404 from the client site B 406 which stops Timer(t0), starts Timer(t1), transmits the ACK create message 445 to the client site B 406, and makes transition 514 from the connecting state 510 to the created state 508. While in the created state 508, no further message is received in client site A 404 and the Timer(t1) expires which is retried a specified number of times such as three times and if the Timer(t1) continues to expire and with no active don't remove conduit flag in effect, the created dynamic conduit is removed at client site A 404, makes transition 522 to the wait state 504, and starts the wait timer to a specified time period. When the wait time expires, a transition 524 is made back to the idle state 502. In client site B 406, when the conduit down Timer(t2) expires and the don't remove conduit flag is not set, a transition 528 is made to wait state 504.

Regarding the fourth event message sequence 450 that responds to a retransmission of an acknowledgement (ACK) when it is not acknowledged of FIG. 4E, the create conduit (CLA, CLB) message 451 is received in client site A 404 from the intermediate site 408 which starts Timer(t0), transmits the create conduit message 453 to the client site B 406, and causes transition 512 to be made from the idle state 502 to the connecting state 510. If the Timer(t0) expires before receiving any message from a peer client, a transition 516 is made back to the idle state 502. While in the connecting state 510 and the Timer(t0) still in operation, a create conduit message 454 is received in the client site A 404 from the client site B 406 which stops Timer(t0), starts Timer(t1), transmits the ACK create message 455 to the client site B 406, and makes transition 514 from the connecting state 510 to the created state 508. The ACK create message 455 does not make it to client site B 406 possibly due to a transmission problem. While in the created state 508 in client site A 404, an ACK create message 456 is received in the client site A 404 from client site B 406 which stops Timer(t1), starts Timer(t2), transmits an ACK ACK message 457 to the client site B 406, and makes transition 518 to the both created state 506. The ACK ACK message 457 does not make it to client site B 406 possibly due to a transmission problem. However, in client site B 406 while in the created state 508, the start ACK Timer(t1) times out making transition 534 and an ACK create message 458 is resent from client site B 406 to client site A 404. While in the both created state 506 in client site A, the ACK create message 458 is received in client site A 404 from the client site B 406 and Timer(t2) is restarted in client site A 404. In client site B 406, a start conduit down Timer(t2) is also started when the ACK ACK message 459 is received making transition 518 from the created state 508 to the both created state 506. In client site A 404, if it is determined that the conduit is not up after Timer(t2) expires and if the don't remove conduit flag is set active, then Timer(t2) is restarted, make transition 526 staying in the both created state 506. The Timer(t2) is restarted if it receives an ACK create message, since from receiving this ACK create message, client site A 404 knows client site B 406 has not received its ACK ACK message. Client site A 404 then retransmits the ACK ACK message and stays in the both created state 506. While in the both created state 506, the dynamic conduit is able to support traffic between the two sites and control traffic is sent on the conduit to bring it up, but at this point no user traffic is sent on the conduit.

Regarding the fifth event message sequence 460 that responds to a first client site restart leading to removal of a dynamic conduit after Timer(t2) timeout of FIG. 4F, the create conduit (CLA, CLB) message 461 is received in client site A 404 from the intermediate site 408 which starts Timer(t0), transmits the create conduit message 443 to the client site B 406, and causes transition 512 be made from the idle state 502 to the connecting state 510. If the Timer(t0) expires before receiving any message from a peer client, a transition 516 is made back to the idle state 502. While in the connecting state 510 and the Timer(t0) still in operation, a create conduit message 464 is received in the client site A 404 from the client site B 406 which stops Timer(t0), starts Timer(t1), transmits the ACK create message 465 to the client site B 406, and makes transition 514 from the connecting state 510 to the created state 508. While in the created state 508, client site A restarts after sending the ACK create message 465 and due to the restart enters the idle state 502.

The intermediate site 408 determines that there is a lot of traffic between client site A 404 and client site B 406 that passes through the intermediate node 408 and reinitiates the dynamic conduit creation process. Client sit A 404 responds as illustrated in FIG. 4B. In FIG. 4F, client site B 406 receives the create conduit message 470 before the Timer(t2) expires. Client site B then stops Timer(t2), restarts Timer (t1), sends ACK create message 471 to client site A 404, and makes transition 536 from the both created state 506 to conduit created state 508. When client site B 406 receives ACK ACK message 472 from client site A 404, client site B 406 makes transition 518 to both created state 506, stops Timer(t1), and starts Timer(t2). In the case that client site A 404 restarts after a dynamic conduit is created, client site A 404 initially enters in the idle state 502, but make transition 540 after receiving an ACK create message, such as the ACK create message 471, to the both created state 506.

FIG. 5B illustrates an exemplary second state machine 550 at a client site in accordance with the present invention. The second state machine 550 is described in relationship to FIGS. 4A-4G and operates as a second state machine in client site A 404 and as a second state machine in client site B 406. The dynamic conduit creation process is described initially from the perspective of client site A 404. The second state machine 550 is comprised of an idle state 502, a wait state 504, a both created state 506, a conduit grow state 552, a conduit use state 554, a conduit down state 556, and a conduit pending removed state 558. The second state machine 550 is initialized to the idle state 502.

Regarding the create dynamic conduit message sequence 400 of FIG. 4A as described above with regard to FIG. 5A, when both client sites A 404 and B 406 reach the both created state 506 separately at each site, the dynamic conduit is initially in a down state. Once the conduit is in the both created state 506, normal conduit traffic is sent and monitored. Once the dynamic conduit is available for use in the both created state 506, both sites stop the Timer(t1) and the Timer(t2), make transition 560 to a conduit grow state 552, and start a conduit grow Timer(t3) with a specified value such as two hundred milliseconds (200 ms). Also, a conduit's ingress flow at each client site is set to an upper limit of 1 flow. When the conduit is up, user data flows can be added to the conduit. Since the quality of the conduit is not fully known at this point, the number of flows directed to the conduit is limited until the conduit has been fully characterized. To accomplish this characterization, a grow process is used with conduit grow state 552. During grow state, flows are gradually added onto the dynamic conduit. For these purposes, a flow is defined as a stream of traffic identified by a unique source and destination IP Address, protocol, and source and destination protocol port numbers. For example, a Voice over IP conversation between two sites A and B would be characterized as one flow for each direction, such as one flow from site A to site B and a second flow from site B to site A. An FTP transfer between workstations at two different sites would be characterized as a second flow, also consisting of one flow for each direction. From site A's perspective, the flow from site A to site B is identified as a WAN ingress flow and, also from site A's perspective, the flow from site B to site A is identified as a WAN egress flow. Both the WAN ingress flow and the WAN egress flow utilize the same dynamic conduit.

The dynamic conduit is initially in a down state. Normal conduit control messages are sent across the conduit to bring the conduit up. Once the conduit is up, both client site A 404 and client site B 406 stop Timer(t1), stop Timer(t2), start Timer(t3) and make transition 560 to a conduit grow state 552. If the conduit is determined to be down, the conduit grow Timer(t3) is stopped and the conduit down Timer(t2) is started, a fail counter is incremented and has a fail count less than a specified value such as less than two, and transition 562 is made to the both created state 506. Transition 526 applies when the conduit is in an active don't remove conduit state. If the conduit is not in an active don't remove conduit state, the conduit will be removed once Timer(t2) expires. If the conduit is in a down state, the conduit is removed at the local site and at the peer site. The remote site also removes the conduit when its Timer(t2) expires. Transition 528 is made to the wait state 504, and a wait timer is started with a specified wait time.

While in the grow state 552 and with the dynamic conduit operational, existing traffic between client site A 404 and client site B 406 that use WAN-to-WAN forwarding are gradually moved over to the newly created dynamic conduit between client site A 404 and client site B 406. When the dynamic conduit is created, the dynamic conduit is allocated a minimum specified bandwidth which requires changing currently allocated bandwidth on other conduits in the APN.

In the conduit grow state 552, K iterations, such as fifteen iterations are used to grow and test the dynamic conduit. The first iteration is treated differently from the other K-1 or 14 iterations, which are set to be 200 ms per iteration. The first iteration depends on the round trip time between both ends of the conduit. In an APN service for conduit traffic, the receiving end sends a selective acknowledgement (SACK) or a selective negative acknowledgement (SNAK) to indicate to the send end which packet is received, which packet is not received, so the send end can retransmit the lost ones, in order for the send end to determine if the path is good or bad. During the conduit grow state 552, in the first iteration one flow is generally used to be on the conduit, and depends on the SACK, SNAK that was received. If everything is good, the flow limit is increased by a pre-specified amount, such as it is doubled, in this initial case to 2, otherwise transmissions stay at the current flow limit. This type of adjustment is made for each iteration. If at end of the K=15 iterations, the flow limit grows to 8192, then the grow state makes transition 564 to conduit use state 554 and the dynamic conduit is put in normal use. Otherwise, the dynamic conduit is taken down beginning at conduit pending remove state 558 and makes transition 575 to wait state 504. While in the wait state 504, if a create conduit (CLA, CLB) message, such as message 431 of FIG. 4C, is sent from the intermediate site 408, a NACK create message will be returned making transition 559 and remaining in the wait state 504.

Traffic flows between sites may be categorized as bulk traffic, interactive traffic, and real time traffic, such as voice communications. Bulk traffic has high bandwidth but high-latency tolerant. Applications that handle file transfer and need high bandwidth are categorized as Bulk Class. Such applications are not very sensitive to loss or latency. Typically TCP will retransmit lost packets, but this will also cause too many retransmissions, thereby affecting application performance. These applications involve very little human interference and are mostly handled by the systems themselves. Examples of bulk applications include file transfer protocol (FTP), trivial file transfer protocol (TFTP), common Internet file system (CIFS) file sharing protocol, and an rsync program for file synchronization and transfers.

Interactive traffic has low to medium latency requirements and low to medium bandwidth requirements. These applications typically have a server-client relationship; they involve human input in the form of mouse clicks or cursor moves from the client side and display graphics sent from the server to the client. Although client to server communication may not need high bandwidth, it is sensitive to loss and latency. Similarly, communication in the direction of server to client may not be sensitive to loss but does need high bandwidth to transfer graphical information. Examples include: Interactive Video, Remote Desktop, secure shell (SSH), hypertext transfer protocol secure (HTTPS), customer information control system (CICS), structured query language (SQL), and virtual network computing (VNC).

Realtime traffic has low latency, low bandwidth, time-sensitive traffic. Applications that are time sensitive but don't really need high bandwidth, such as voice over IP networks, can be categorized as Realtime. These applications are very sensitive to latency and jitter, but may tolerate some loss. Sometimes it is better to lose a few packets but not so many that it causes distortion.

While in grow state, bulk traffic is moved over to the dynamic conduit first, then if more capacity is available, the interactive traffic is moved over next. If the dynamic conduit has greater capacity than used by the combined bulk traffic and interactive traffic, the real time traffic, such as voice communications is moved over to the dynamic conduit next. Prior to moving traffic over to the dynamic conduit, an in-demand flag is set active to cause more bandwidth to be allocated to the dynamic conduit. The in-demand flag is a flag that exists in conduit control messaging and is generally set by a sending site when it has a backlog of packets for the receiver and it would like the receiver to allocate more bandwidth so the sender can send at a faster rate. The dynamic conduit grow process is configured to set the in-demand flag so that the bandwidth allocation code allocates bandwidth for the new conduit even though no, or very little, traffic is actually using the conduit. This prevents a degradation of quality that can happen if the initial bandwidth allocation is low and keeps having to be bumped up as traffic is moved to the new conduit. For example, the bandwidth allocation process reallocates every 100 ms and it can take a few cycles to converge on the correct amount of bandwidth needed.

The in-demand flag is used between sites A and B. On each site, the local site attempts to allocate bandwidth to each conduit it has by looking at each conduit's current usage and associated in-demand flag. If a conduit has an associated in-demand flag set, that conduit receives more than the current usage.

Figure 6A:
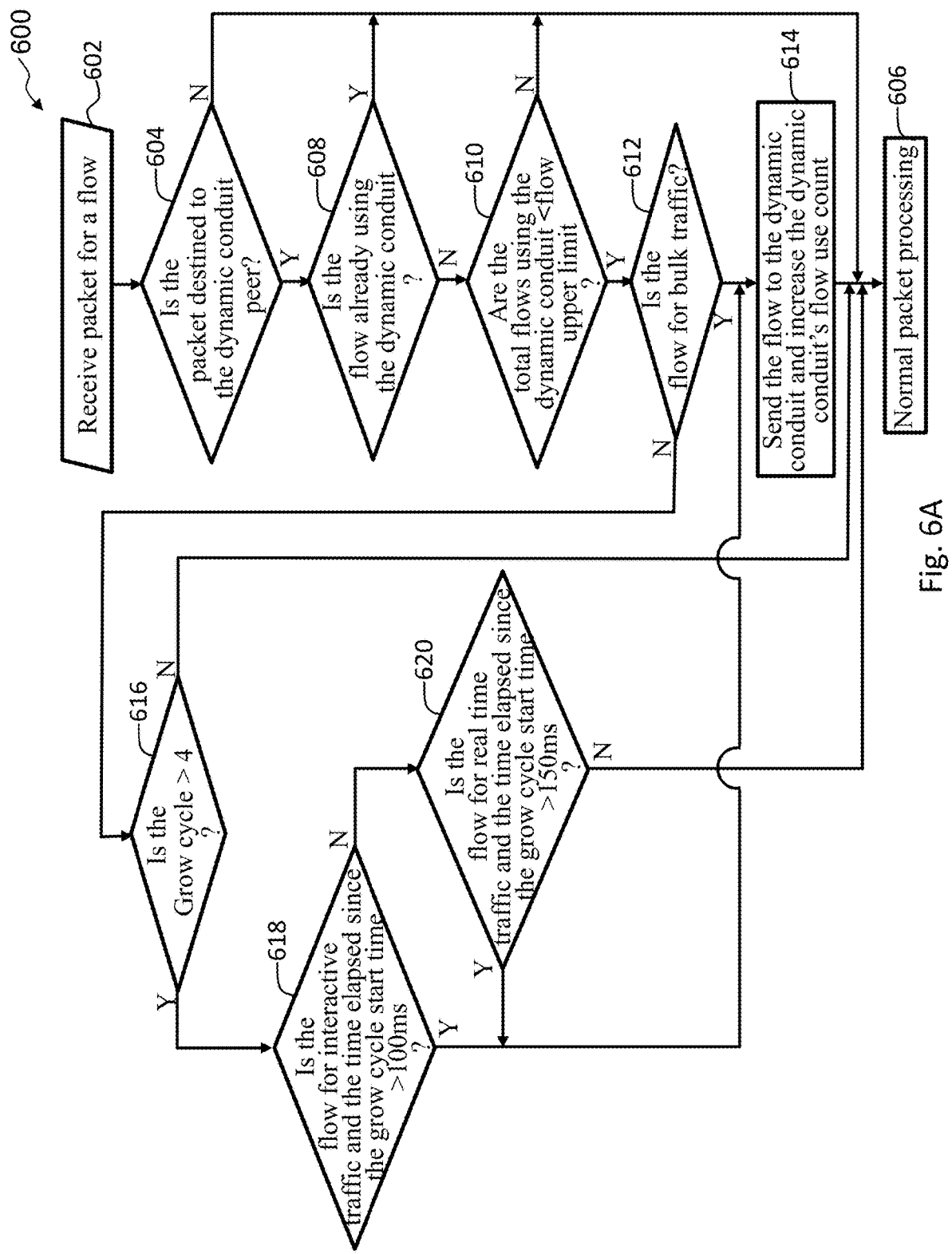
FIG. 6A illustrates an exemplary packet process that takes into account a grow process when bringing up a dynamic conduit in accordance with the present invention.

FIG. 6A illustrates an exemplary packet process 600 that takes into account a grow process when bringing up a dynamic conduit in accordance with the present invention. Once in the grow state 552 of FIG. 5B, the packet process 600 is run for each packet received on a WAN ingress flow to determine if the flow should be moved to the dynamic conduit, as described in more detail below. At block 602, a packet is received for a flow. At block 604, a determination is made whether the packet is destined for a dynamic conduit peer site. If the determination finds that the packet is not destined for the dynamic conduit peer site, the process 600 proceeds to block 606 to continue normal processing of the packet. If the determination finds that the packet is destined for the dynamic conduit peer site, the process 600 proceeds to block 608. At block 608, a determination is made whether the flow is already using the dynamic conduit. If the determination finds that the flow is already using the dynamic conduit, the process 600 proceeds to block 606 to continue with normal processing of the packet. If the determination finds that the flow is not already using the dynamic conduit, the process 600 proceeds to block 610. At block 610, a determination is made whether the total number of flows using the dynamic conduit is less than the flow upper limit. The determination made at block 610 allows traffic to be gradually added to the dynamic conduit to ensure the dynamic conduit can handle the increased traffic. If the determination finds that the total number of flows using the dynamic conduit is greater than or equal to the flow upper limit, the process 600 proceeds to block 606 to continue with normal processing of the packet. If the determination finds that the total number of flows using the dynamic conduit is less than the flow upper limit, the process 600 proceeds to block 612. At block 612, a determination is made whether the flow is for bulk traffic. If the flow is for bulk traffic, the process 600 proceeds to block 614. At block 614, the flow is sent to the dynamic conduit and the dynamic conduit's flow use count, as used in block 610, is increased. At block 606, the process 600 continues with normal processing of the packet.

Returning to block 612, if the determination finds that the flow is not for bulk traffic, the process 600 proceeds to block 616. At an early stage of the grow process, real time or interactive flows, which are more sensitive to packet loss, are not initially moved to the newly created dynamic conduit until the quality of the dynamic conduit can be determined. At block 616, a determination is made whether the grow cycle is greater than four. A grow cycle of four is determined by system evaluation. If the determination finds that the grow cycle is not greater than four, the process 600 proceeds to block 606 to continue with normal processing of the packet. If the determination finds that the grow cycle is greater than four, the process 600 proceeds to block 618. At block 618, a determination is made whether the flow is for interactive traffic and whether the time elapsed since the grow start time is greater than 100 ms. The time elapsed since the grow cycle start time is determined by subtracting the grow start time from the current time. If the conditions of block 618 are not met, the process 600 proceeds to block 620. At block 620, a determination is made whether, the flow is for real time traffic and whether the time elapsed since the grow cycle start time is greater than 150 ms. If the conditions of block 620 are not met, the process 600 proceeds to block 606 to continue with normal processing of the packet. If the conditions of block 620 are met, the process 600 proceeds to block 614. Returning to block 618, if the conditions of block 618 are met, the process 600 proceeds to block 614. At block 614, the flow is sent to the dynamic conduit and the dynamic conduit's flow use count, as used in block 610, is increased.

Figure 6B:
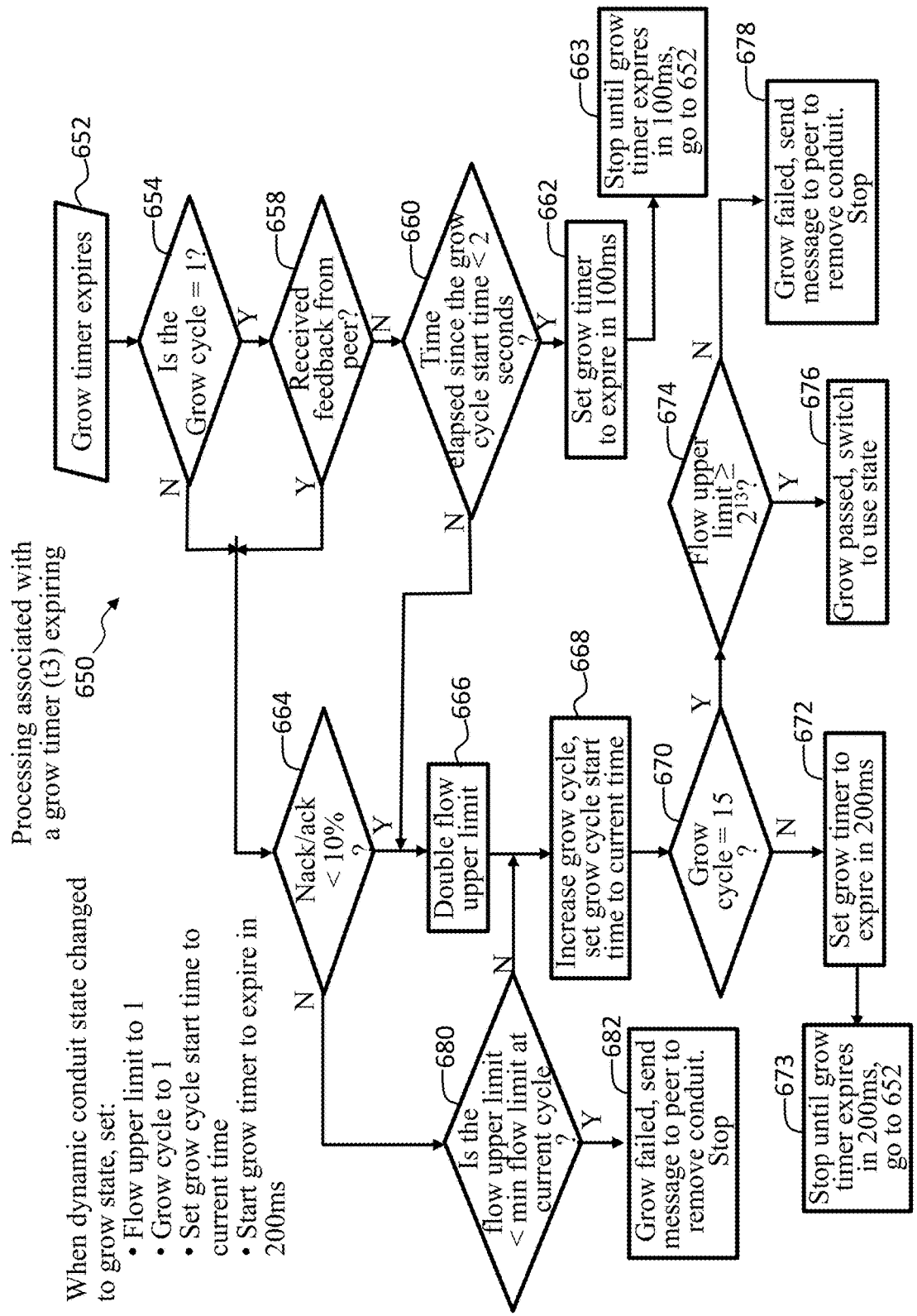
FIG. 6B illustrates an aspect of a grow process associated with a grow Timer(t3) expiring in accordance with the present invention.

FIG. 6B illustrates an aspect of a grow process 650 associated with a grow Timer(t3) expiring in accordance with the present invention. Once in the grow state 552 of FIG. 5B, the grow Timer(t3) is started and every time the Timer(t3) expires the grow process 650 is run to determine whether the dynamic conduit's flow upper limit should be doubled and determine when the upper limit is reached to switch to a use state, such as the conduit use state 554 of FIG. 5B. When the state of a dynamic conduit is changed to a grow state, such as the conduit grow state 552 of FIG. 5B, a flow upper limit is initially set to one, a grow cycle is also initially set to one, a grow cycle start time is set to the current time, and grow timer is set to expire in 200 ms. At block 652, the grow Timer(t3) expires. At block 654, a determination is made whether the grow cycle equals one. If the grow cycle does equal one, as it will be on the first pass through the process 650, the process 650 proceeds to block 658. The grow cycle is increased at block 668 as described below. At block 658, a determination is made whether feedback has been received from a peer client site. If no feedback has been received, the process 650 proceeds to block 660. At block 660, a determination is made whether the time elapsed since the grow cycle start time is less than two seconds. If the time elapsed since the grow cycle start time is less than two seconds, the process 650 proceeds to block 662. At block 662, a grow timer is set to 100 ms and then the grow timer is started. At block 663, the process 650 is stopped until the grow timer expires in 100 ms and then the process 650 restarts at block 652.

Returning to block 654, if it is determined that the grow cycle does not equal one, the process 650 proceeds to block 664. Also, at block 658, if it is determined that feedback has been received from the peer client site, the process 650 also proceeds to block 664. At block 664, a determination is made whether a rate of receiving not acknowledge (NACK) messages compared to receiving acknowledge (ACK) messages is less than ten percent or less than a single digit percent, such as less than eight percent. If it is determined the NACK/ACK rate is greater than or equal to ten percent, the process 650 proceeds to block 680.

A flow upper limit is a parameter that is doubled for each cycle if the message transfers on the dynamic conduit are going well. If the message transfers are not going well, the value of the flow upper limit stays the same as determined in the previous cycle. The flow upper limit is not a pre-specified value. A minimum flow limit for each cycle is a pre-specified value. For cycles 0-2, the minimum flow limit is set to a zero, for cycle 3, the minimum flow limit is set to a one, for cycle 4, the minimum flow limit is set to a 2, and the minimum flow limit is incremented for each succeeding cycle until for cycle N, the minimum flow limit is set to $2^{(N-3)}$.

At block 680, a determination is made whether the flow upper limit is less than the minimum flow limit at the current cycle. If the flow upper limit is less than the minimum flow limit at the current cycle, the process 650 proceeds to block 682. At block 682, the grow process is stopped since it has failed based on the received measurements of the dynamic conduit activity, and a remove conduit message, such as the remove conduit request message 483 of FIG. 4G, is sent to the peer client site.

Returning to block 664, if it is determined that the NACK/ACK rate is less than ten percent, the process 650 proceeds to block 666. Also, returning to block 660, if it is determined that the time elapsed since the grow cycle start time is not less than two seconds, the process 650 also proceeds to block 666. At block 666, the flow upper limit is doubled, or otherwise increased by a pre-specified amount. At block 668, the grow cycle is increased by one for each cycle reaching block 668 with the grow cycle start time set to the current time. At block 670, a determination is made whether the grow cycle is equal to fifteen. If the grow cycle is not equal to fifteen, the process 650 proceeds to block 672. At block 672, the grow timer is set to expire in 200 ms and the grow timer is started. At block 673, the process 650 is stopped until the grow timer expires in 200 ms and then the process 650 restarts at block 652.

Returning to block 670, if the determination finds that grow cycle is equal to fifteen, the process 650 proceeds to block 674. At block 674, a determination is made whether the flow upper limit is greater than or equal to 8192 ($2^{13}$). If the flow upper limit is determined to be greater than or equal to 8192, the process 650 proceeds to block 676. At block 676, the process 650 indicates the grow process has passed and the system makes a transition to a use state, such as the conduit use state 554 of FIG. 5B. If the flow upper limit is determined to be less than 8192, the process 650 proceeds to block 678. At block 678, the grow process is stopped since it has failed based on the received measurements of the dynamic conduit activity, and a remove conduit message, such as the remove conduit request message 483 of FIG. 4G, is sent to the peer client site.

Returning to block 680, if the determination finds that the flow upper limit is not less than the minimum flow limit at the current cycle, the process 650 proceeds to block 668 where the grow cycle is increased with the grow cycle start time set to the current time. The process 650 then proceeds through blocks 670-678 depending upon the determinations made at blocks 670 and 674 as described above.

Figure 7:
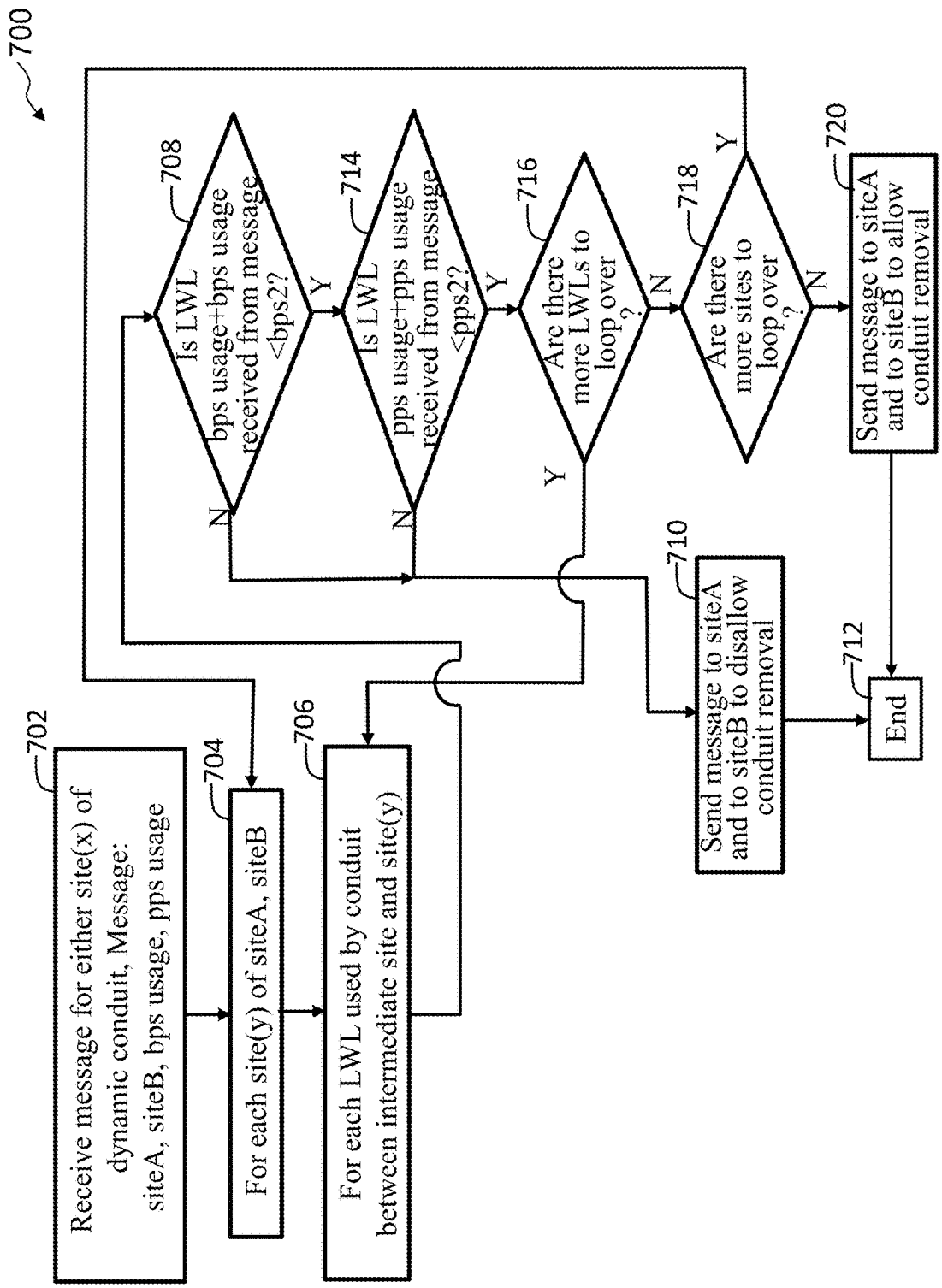
FIG. 7 illustrates an exemplary process that is used to remove a dynamic conduit in accordance with the present invention.

FIG. 7 illustrates an exemplary process 700 that operates in the intermediate site and is used to remove a dynamic conduit in accordance with the present invention. When the intermediate site receives a remove dynamic conduit request message, such as message 481 of FIG. 4G from client site A, the process 700 is run to determine whether to allow removal of a dynamic conduit or not allow removal of the dynamic conduit. At block 702, a remove conduit message, such as the remove conduit (CLA, CLB) message 481 of FIG. 4G, is received in the intermediate site from either site A or site B that is served by a dynamic conduit. The received message includes dynamic conduit information, such as the two sites A and B being supported by the dynamic conduit, bits per second (bps) usage and packets per second (PPS) usage across the dynamic conduit. At block 704, a first loop is set up for each site(y), site A or site B. At block 706 a second loop is set up for each LWL used by a conduit between intermediate site and site(y). At block 708, a determination is made whether the LWL bps usage plus the bps usage received from the message is less than the second threshold bps2. If the LWL bps usage plus the bps usage received from the message is less than the second threshold bps2, the process 700 proceeds to block 714. At block 714, a determination is made whether the LWL pps usage plus the pps usage received from the message is less than the second threshold pps2. If the LWL pps usage plus the pps usage received from the message is less than the second threshold pps2, the process 700 proceeds to block 716. At block 716, a determination is made whether there are more LWLs to loop over. If it is determined that there are no more LWLs to loop over, the process 700 proceeds to block 718. At block 718, a determination is made whether there are more sites to loop over. For example, the process 700 loops over site A and site B. If it is determined that there are no more sites to loop over, the process 700 proceeds to block 720. At block 720, the intermediate site sends a remove conduit message to site A and site B to allow the removal of the dynamic conduit. The process 700 then proceeds to block 712 to end the process 700.

Returning to block 708 and 714, wherein if either block 708 or 714 makes a negative determination, the process 700 proceeds to block 710. At block 710, the intermediate site sends a message to both sites A and B to disallow the removal of the dynamic conduit. The process 700 then proceeds to block 712 to end the process 700.

Returning to block 716, if it is determined that there are more LWLs to loop over, the process 700 proceeds to block 706, part of the second loop, where the next LWL is selected and then the process 700 returns to block 708 to start the process for the next selected LWL. In a similar manner, at block 718, if it is determined that there are more sites to loop over, the process 700 proceeds to block 704, part of the first loop, where the next site is selected and then the process proceeds to block 706 to select the LWL for the selected next site. The process 700 then returns to block 708 to start the process for the next selected LWL.

In addition to the dynamic conduit creation processes described above, it is sometimes desirable to manually trigger creation of a dynamic conduit at a user's request. For example, a user may want to test the performance of a dynamic conduit, debug issues found on a dynamic conduit, or to set up a dynamic conduit before an event, such as an important conference meeting. When the dynamic conduit is triggered manually, the don't remove flag is also set active on the conduit so that the dynamic conduit won't be automatically removed because there are low or no traffic on the conduit.

To manually create the dynamic conduit between a site A and a site B, the site A must be in idle state 502 of FIG. 5A in a first state machine 500 of site A and at a user's request, a create conduit message, such as the create conduit message 423 in FIG. 4B, is sent from the site A to the site B. After site B receives the message 423, and if it gets sufficient resources, site B then makes transition 530 of FIG. 5A in a first state machine 500 of site B to the created state 508, and sends an ACK create message 424 to site A. After site A receives the ACK create message 424 from site B, site A makes transition 540 to both the created state 506 in the first state machine in site A, and sends an ACK ACK message 425 to site B. After site B receives the message 425, site B makes transition 518 to both created state 506 in the first state machine in site B. Then conduit control packets are transferred on the newly created dynamic conduit to bring the dynamic conduit up, and then proceed to conduit grow state, such as conduit grow state 552 of FIG. 5B in each respective state machine in each site, as part of a normal dynamic conduit creation process.

While the present invention has been disclosed in the context of various aspects of presently preferred embodiments, it will be recognized that the invention may be suitably applied to other environments consistent with the claims which follow.

We claim:

1. A method for growing communication capacity in a dynamically created conduit between two sites, the method comprising:
   changing a two hop communication pattern between a site A, an intermediate site, and a site B to a dynamic conduit with a one hop communication pattern between the site A and the site B without use of the intermediate site, wherein the intermediate site performs wide area network (WAN)-to-WAN forwarding between site A and site B over a first local WAN link (LWL) between site A and the intermediate site and a second LWL between site B and the intermediate site and changing the two-hop communication pattern to a one-hop communication pattern includes:
      monitoring, by the intermediate site, throughput statistics between site A and site B over the first and second LWLs;
      determining that one of the LWLs is congested or that traffic usage on one of the LWLs exceeds a threshold; and
      in response to determining that one of the LWLs is congested or that traffic usage on one of the LWLs exceeds the threshold, sending a message to site A and site B to trigger creation of the dynamic conduit;
   initiating a grow state on the dynamic conduit by setting a flow limit to an initial value and transferring bulk data flows, originally communicated through the intermediate site, directly across the dynamic conduit between site A and site B;
   while in the grow state, increasing the number of flows to the dynamic conduit such that the number of flows using the dynamic conduit is less than or equal to the flow limit and iteratively increasing the flow limit of the dynamic conduit, where each of the number of flows is a stream of traffic identified by a unique source Internet protocol (IP) address, destination IP address, protocol, and source and destination port numbers;
   wherein iteratively increasing the flow limit includes increasing the flow limit by a pre-specified amount each sampling cycle upon a determination that the bulk data flows transferred with minimum errors during each sampling cycle;
   determining whether the flow limit reaches a predetermined value in a predetermined number of the sampling cycles; and
   in response to determining that the flow limit reaches the predetermined value in the predetermined number of the sampling cycles, changing from the grow state to a client use state.

2. The method of claim 1, wherein the sampling cycle is user set to be greater than a round trip message transfer time between the site A and the site B.

3. The method of claim 1 further comprising:
   increasing the flow limit having an initial value of one by doubling the flow limit each sampling cycle while in the grow state; and
   determining the flow limit is greater than or equal to the flow upper limit after K sampling cycles to change to the client user state.

4. The method of claim 1, wherein the minimum errors are for transfers across the dynamic conduit that occurred with a not acknowledged (NACK) divided by an acknowledged (ACK) rate is less than a single digit percent.

5. The method of claim 1 further comprising:
   setting an in-demand flag active in the site A and in the site B to cause more bandwidth to be allocated to the dynamic conduit.

6. The method of claim 5 further comprising:
   adding interactive traffic between the site A and the site B as more bandwidth is allocated to the dynamic conduit; and
   adding realtime traffic between the site A and the site B as more bandwidth, above that required for the interactive traffic, is allocated to the dynamic conduit.

7. The method of claim 1 further comprising:
   incrementally moving traffic between site A and site B that use WAN-to-WAN forwarding through the intermediate site over to the dynamic conduit between site A and site B while in the grow state.

8. The method of claim 1 wherein flows marked as interactive are not allowed to use the dynamic conduit until a first time period has elapsed and flows marked as realtime are not allowed to use the dynamic conduit until a second time period has elapsed, wherein the second time period is greater than the first time period.

9. A method for growing communication capacity in the presence of multiple site pairs contending for dynamic conduit resources, the method comprising:
   determining to create a dynamic conduit between two sites by a site that is intermediate between the two sites, wherein the intermediate site tracks local wide area network (WAN) link (LWL) usages associated with multiple site pairs including the two sites, wherein the intermediate site performs WAN-to-WAN forwarding between the two sites over LWLs between the intermediate site and each of the two sites and determines that one of the LWLs is congested or that traffic usage on one of the LWLs exceeds a threshold;
   transferring, by the intermediate site, those LWLs associated with the two sites that are most congested among the multiple site pairs to a dynamic conduit between the two sites to enable the site pairs to communicate directly over the dynamic conduit, wherein transferring the LWLs associated with the two sites that are most congested includes sending, by the intermediate site, a message to each of the two sites that are most congested to trigger creation of the dynamic conduit;
   creating, by the two sites, the dynamic conduit;
   initiating a grow state on the dynamic conduit by setting a flow limit to an initial value and transferring bulk data flows, originally communicated through the intermediate site, directly across the dynamic conduit;
   while in the grow state, increasing the number of flows to the dynamic conduit such that the number of flows using the dynamic conduit is less than or equal to the flow limit and iteratively increasing the flow limit of the dynamic conduit, where each of the number of flows is a stream of traffic identified by a unique source Internet protocol (IP) address, destination IP address, protocol, and source and destination port numbers;
   determining whether the flow limit reaches a predetermined value in a predetermined number of the sampling cycles; and
   in response to determining that the flow limit reaches the predetermined value in the predetermined number of the sampling cycles, changing from the grow state to a client use state.

10. The method of claim 9, wherein the congestion at the intermediate site is reduced.

11. The method of claim 9 further comprising:
   creating a dynamic conduit between a second two sites by a user request.

12. A non-transitory computer readable medium having stored thereon executable instructions that when executed by a processor of a computer control the computer to perform steps comprising:
   changing a two hop communication pattern between a site A, an intermediate site, and a site B to a dynamic conduit with a one hop communication pattern between the site A and the site B without use of the intermediate site, wherein the intermediate site performs wide area network (WAN)-to-WAN forwarding between site A and site B over a first local WAN link (LWL) between site A and the intermediate site and a second LWL between site B and the intermediate site and changing the two-hop communication pattern to a one-hop communication pattern includes:
      monitoring, by the intermediate site, throughput statistics between site A and site B over the first and second LWLs;
      determining that one of the LWLs is congested or that traffic usage on one of the LWLs exceeds a threshold; and
      in response to determining that one of the LWLs is congested or that traffic usage on one of the LWLs exceeds the threshold, sending a message to site A and site B to trigger creation of the dynamic conduit;
   initiating a grow state on the dynamic conduit by setting a flow limit to an initial value and transferring bulk data flows, originally communicated through the intermediate site, directly across the dynamic conduit between site A and site B;
   while in the grow state, increasing the number of flows to the dynamic conduit such that the number of flows using the dynamic conduit is less than or equal to the flow limit and iteratively increasing the flow limit of the dynamic conduit, where each of the number of flows is a stream of traffic identified by a unique source Internet protocol (IP) address, destination IP address, protocol, and source and destination port numbers;
   wherein iteratively increasing the flow limit includes increasing the flow limit by a pre-specified amount each sampling cycle upon a determination that the bulk data flows transferred with minimum errors during each sampling cycle;
   determining whether the flow limit reaches a predetermined value in a predetermined number of the sampling cycles; and
   in response to determining that the flow limit reaches the predetermined value in the predetermined number of the sampling cycles, changing from the grow state to a client use state.

13. The non-transitory computer readable medium of claim 12, wherein the sampling cycle is user set to be greater than a round trip message transfer time between the site A and the site B.

14. The non-transitory computer readable medium of claim 12 further comprising:
   increasing the flow limit having an initial value of one by doubling the flow limit each sampling cycle while in the grow state; and
   determining the flow limit is greater than or equal to the flow upper limit after K sampling cycles to change to the client user state.

15. The non-transitory computer readable medium of claim 12, wherein the minimum errors are for transfers across the dynamic conduit that occurred with a not acknowledged (NACK) divided by an acknowledged (ACK) rate is less than a single digit percent.

16. The non-transitory computer readable medium of claim 12 further comprising:
   setting an in-demand flag active in the site A and in the site B to cause more bandwidth to be allocated to the dynamic conduit.

17. The non-transitory computer readable medium of claim 16 further comprising:
   adding interactive traffic between the site A and the site B as more bandwidth is allocated to the dynamic conduit; and
   adding real time traffic between the site A and the site B as more bandwidth, above that required for the interactive traffic, is allocated to the dynamic conduit.

18. The non-transitory computer readable medium of claim 12 further comprising:
   incrementally moving traffic between site A and site B that use WAN-to-WAN forwarding through the intermediate site over to the dynamic conduit between site A and site B while in the grow state.

19. The non-transitory computer readable medium of claim 12 wherein flows marked as interactive are not allowed to use the dynamic conduit until a first time period has elapsed and flows marked as real time are not allowed to use the dynamic conduit until a second time period has elapsed, wherein the second time period is greater than the first time period.

* * * * *